(12) United States Patent
Morita et al.

(10) Patent No.: US 6,349,892 B2
(45) Date of Patent: Feb. 26, 2002

(54) MAGNETIC TAPE CARTRIDGE

(75) Inventors: Kiyoo Morita; Hideaki Shiga; Daisuke Takahashi, all of Kanagawa-ken; Yusuke Ishihara; Seiji Tsuyuki, both of Kanagawa, all of (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/785,255

(22) Filed: Feb. 20, 2001

Related U.S. Application Data

(62) Division of application No. 09/217,628, filed on Dec. 22, 1998.

(30) Foreign Application Priority Data

Dec. 22, 1997 (JP) ................................. 9-352994

(51) Int. Cl.⁷ ............................ G03B 23/02; G03B 1/18; G11B 23/02
(52) U.S. Cl. ................................ 242/347.1; 242/326.2; 360/132
(58) Field of Search .......................... 242/347.1, 347, 242/348, 348.4, 326, 326.2, 326.1; 360/132, 133, 93, 95; 369/291

(56) References Cited

U.S. PATENT DOCUMENTS

| | | | |
|---|---|---|---|
| 3,861,611 A | 1/1975 | Esashi et al. | 242/347.1 X |
| 4,045,821 A | 8/1977 | Fujikura | |
| 4,559,575 A | 12/1985 | Noto et al. | 360/132 |
| 4,620,254 A | 10/1986 | Smith, II | |
| 4,744,530 A * | 5/1988 | Cybulski et al. | 360/132 X |
| 5,161,079 A | 11/1992 | Ohshima et al. | 360/132 |
| 5,610,789 A | 3/1997 | Miller | |
| 6,125,012 A * | 9/2000 | Miyazaki et al. | 360/132 X |

FOREIGN PATENT DOCUMENTS

| | | | |
|---|---|---|---|
| EP | 0 537 714 A2 | 4/1993 | G11B/23/26 |
| FR | 2 076 903 | 10/1971 | G11B/23/00 |
| FR | 2 420 818 | 10/1979 | G11B/23/04 |
| JP | 60 001685 | 1/1985 | G11B/23/087 |
| WO | WO 83/04453 | 12/1983 | G11B/15/00 |

OTHER PUBLICATIONS

C. P. Barnard, et al.: Door Actuator For Tape Cartridge. IBM Technical Disclosure Bulletin, vol. 8, No. 1, Jun. 1965, pp. 162–163. XP–002099698.

* cited by examiner

*Primary Examiner*—William A. Rivera
(74) *Attorney, Agent, or Firm*—Sughrue Mion, PLLC

(57) ABSTRACT

A magnetic tape cartridge includes a cartridge casing formed by upper and lower casing halves and a single reel around which a magnetic tape is wound and which is contained in the cartridge casing for rotation. A slide door for opening and closing a tape outlet opening is mounted on the cartridge casing to be linearly slidable along a door passage between a closing position where it closes the tape outlet opening and an opening position where it opens the tape outlet opening. A door spring for urging the slide door toward the closing position and holding the same in the closing position is disposed on the door passage.

1 Claim, 39 Drawing Sheets

FIG. 34A  FIG. 34B  FIG. 34C
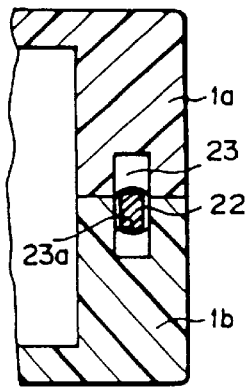 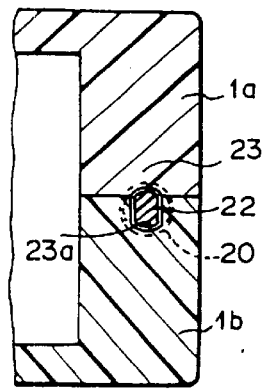 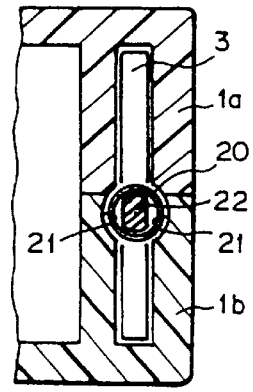
FIG. 35A
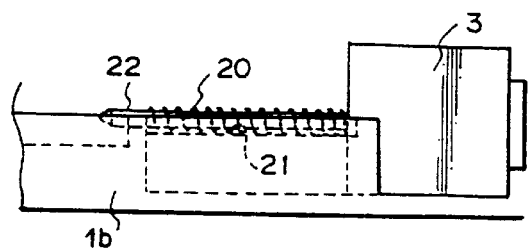
FIG. 35B
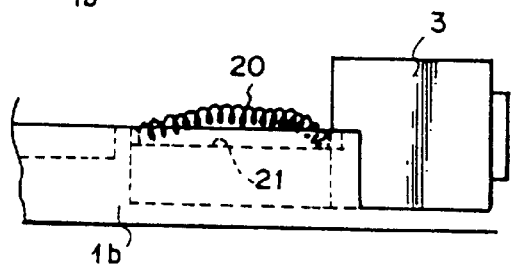
FIG. 36
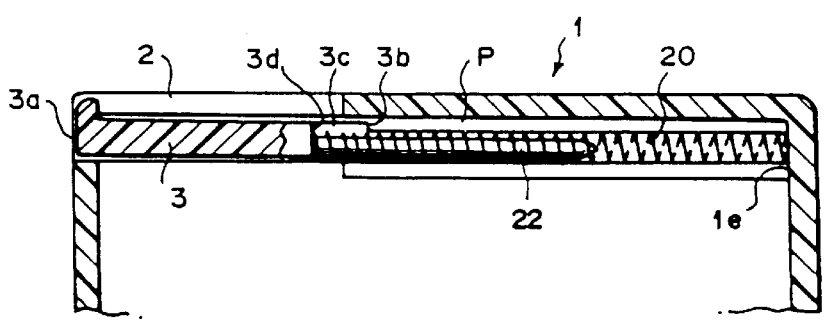

FIG. 40
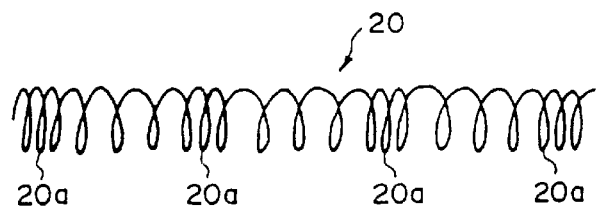
FIG. 41A   FIG. 41B   FIG. 41C
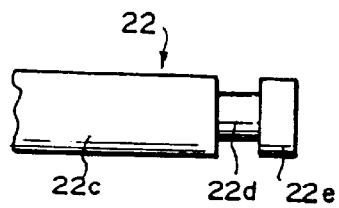 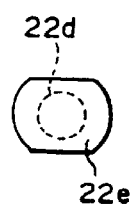 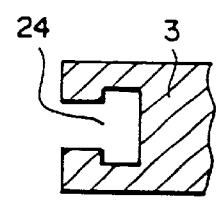
FIG. 42
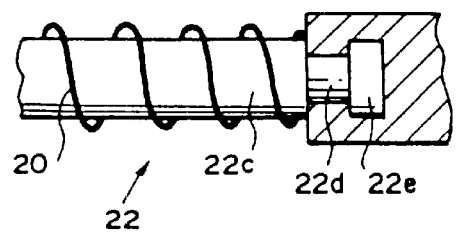

F I G. 55
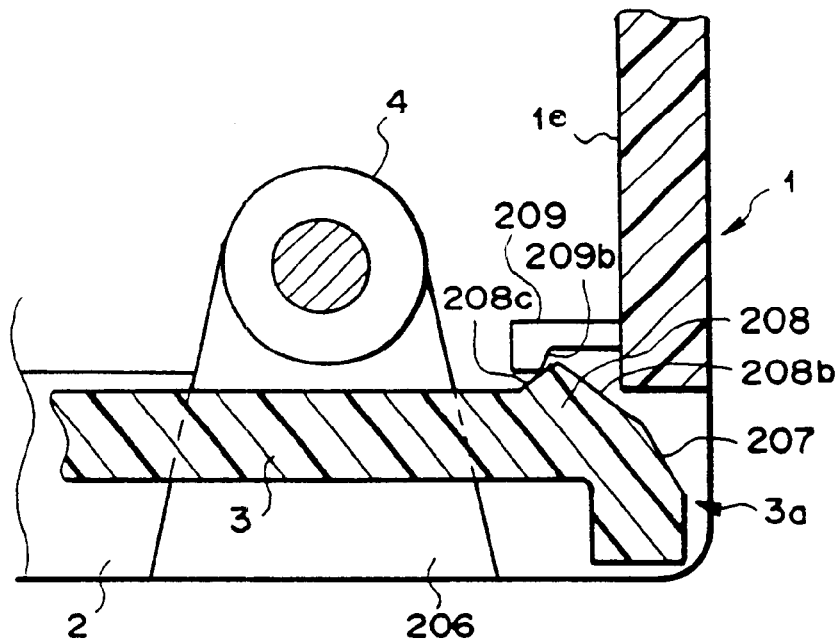
F I G. 56
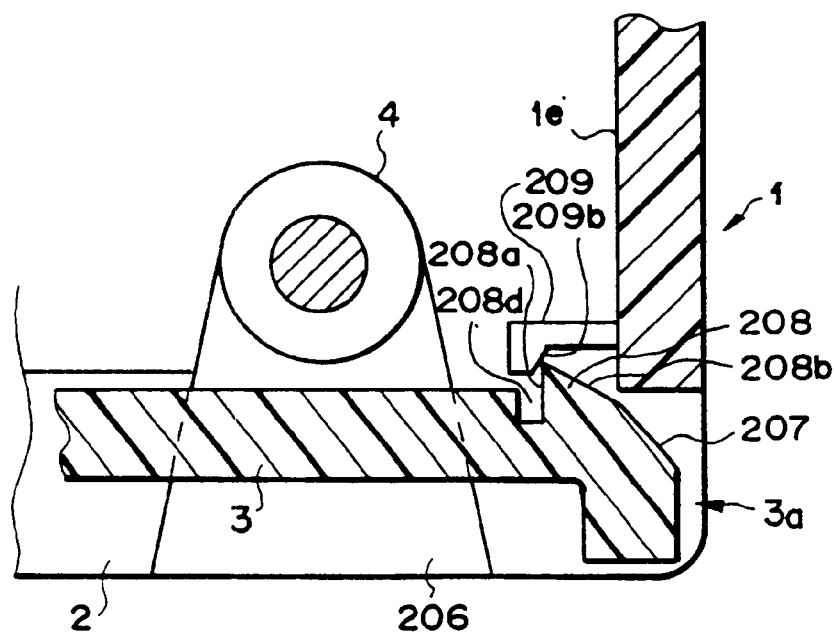

F I G. 60
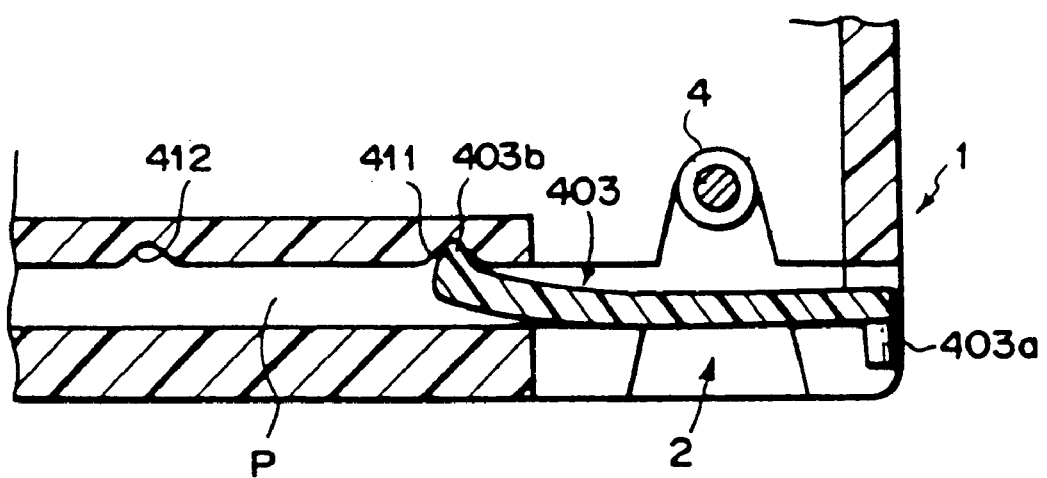

MAGNETIC TAPE CARTRIDGE

This application is a Divisional of Ser. No. 09/217,628 filed Dec. 22, 1998.

BACKGROUND OF THE INVENTION

1. Field of the Invention

This invention relates to a magnetic tape cartridge comprising a cartridge casing formed by upper and lower casing halves and a single reel around which a magnetic tape is wound and which is contained in the cartridge casing for rotation, and more particularly to such as magnetic tape cartridge provided with a slide door for opening and closing a tape outlet opening formed in the cartridge casing.

2. Description of the Related Art

There has been known a single reel magnetic tape cartridge comprising a flat cartridge casing which is formed by upper and lower casing halves and is substantially square in shape and a single reel around which a magnetic tape is wound and which is contained in the cartridge casing for rotation. Such a single reel magnetic tape cartridge has been used for retaining data of a computer or the like. A tape outlet opening is formed in a side wall of the cartridge casing and when the magnetic tape cartridge is used, i.e., when the magnetic tape cartridge is loaded in a recording and reproducing system as, for instance, an external storage for a computer and information is to be recorded on the magnetic tape or information recorded on the magnetic tape is to be read, the magnetic tape wound around the reel is drawn out through the tape outlet opening.

In such a magnetic tape cartridge of one type, a leader block is fixed to the leading end of a leader tape which is connected to the magnetic tape and when the magnetic tape cartridge is not used, the magnetic tape is fully wound around the reel with the leader block fitted in the tape outlet opening to close the tape outlet opening. In the case of the magnetic tape cartridge of this type, when the magnetic tape cartridge is loaded in the recording and reproducing system, a drive means in the recording and reproducing system engages with engagement teeth on the reel exposed outside at the central portion of the lower casing half and a tape drawing mechanism in the recording and reproducing system chucks the leader block and draws the magnetic tape outside the cartridge casing into a tape running path of the recording and reproducing system.

In another type, the tape outlet opening is closed and opened by a lid which is rotatable between a closing position where it closes the tape outlet opening and an opening position where it opens the tape outlet opening, the lid being urged by a spring toward the closing position and locked in the closing position by a lid lock spring-urged in the lock position. A hook member is fixed to the leading end of a leader tape which is connected to the magnetic tape and when the magnetic tape cartridge is not used, the magnetic tape is fully wound around the reel with the hook member retracted inside the tape outlet opening and the lid held in the closing position. In the case of the magnetic tape cartridge of this type, when the magnetic tape cartridge is loaded in the recording and reproducing system, a drive means in the recording and reproducing system engages with engagement teeth on the reel exposed outside at the central portion of the lower casing half and a tape drawing mechanism in the recording and reproducing system moves the lid to the opening position, chucks the hook member and draws the magnetic tape outside the cartridge casing into a tape running path of the recording and reproducing system.

The magnetic tape cartridge of the former type is advantageous in that the tape drawing mechanism of the tape drive system may be simple in structure since the tape drawing mechanism has only to chuck the leader block and draws the same. However there is a problem that dust is apt to enter the cartridge casing through the space between the leader block and the tape outlet opening when the magnetic tape cartridge is not used.

Though being free from the problem that dust is apt to enter the cartridge casing, the magnetic tape cartridge of the latter type is disadvantageous in that the lid lock must be released and the lid must be opened, which complicates the structure of the tape drawing mechanism. Further the space for rotating the lid is required in the tape drive system, and at the same time, incorporation of the springs for urging the lid and the lid lock in the cartridge casing takes a large man-hour.

SUMMARY OF THE INVENTION

In view of the foregoing observations and description, the primary object of the present invention is to provide a magnetic tape cartridge which is free from all the problems described above.

In accordance with the present invention, there is provided a magnetic tape cartridge comprising a cartridge casing formed by upper and lower casing halves and a single reel around which a magnetic tape is wound and which is contained in the cartridge casing for rotation, wherein the improvement comprises that a slide door for opening and closing a tape outlet opening is mounted on the cartridge casing to be linearly slidable along a passage between a closing position where it closes the tape outlet opening and an opening position where it opens the tape outlet opening, and a door spring for urging the slide door toward the closing position and holding the same in the closing position is disposed on the passage of the slide door.

With this arrangement, the fear that dust enters the cartridge casing through the tape outlet opening while the magnetic tape cartridge is not used can be eliminated, and no space for permitting the slide door to move to the opening position is necessary in the tape drive system.

Further since the slide door is simply held in the closed position by the door spring, the slide door can be opened by simply pushing the door overcoming the force of the door spring without releasing a lock, whereby the tape drawing mechanism may be simple in structure.

In one embodiment of the present invention, guide grooves for guiding the upper end lower ends of the slide door along the passage are formed respectively on the upper and lower casing halves and the door spring is in the form of a wire spring or a plate spring which is held between the upper and lower casing halves at one end and abuts against the rear end face of the slide door at the other end.

A wall portion which prevents the door spring from being disengaged from the slide door while the slide is slid between the opening position and the closing position may be provided on the cartridge casing.

With this arrangement, incorporation of the door spring is facilitated.

In another embodiment of the present invention, a closed space defining the passage of the slide door is formed between the upper and lower casing halves and the rear end face of the slide door and the door spring in the form of a plate spring is disposed in the closed space with its ends in abutment against the end wall of the closed space and the rear end face of the slide door, respectively.

With this embodiment, the door spring may be simply thrown in the closed space, and accordingly incorporation of the door spring is extremely facilitated.

The door spring may be a coiled spring whose longitudinal axis extends in parallel to the direction of sliding movement of the slide door. In this case, it is preferred that the coiled spring be disposed in a space surrounded by ribs respectively extending from the upper and lower casing halves. With this arrangement, the door spring can be held in place.

Further it is preferred that a bent portion against which the coiled spring abuts be formed on a rear end portion of the slide door. With this arrangement, the coiled spring can be surely abuts against the slide door.

BRIEF DESCRIPTION OF THE DRAWINGS

FIG. 36 is a cross-sectional view showing a modification of the thirteenth embodiment, FIG. 40 is a front view showing a modification of the coiled spring, FIG. 41C is a fragmentary plan view of an important part of the rod, FIG. 41B is a side view of the rod and FIG. 41C is a fragmentary cross-sectional view of an important part of the slide door when the rod is formed separately from the slide door, FIG. 42 is a side view partly in cross-section showing the spring support rod fixed to the slide door, FIGS. 55 and 56 are views similar to FIG. 53 but showing modifications of the nineteenth embodiment, FIG. 60 is a fragmentary cross-sectional view showing an important part of the magnetic tape cartridge in accordance with a twenty-first embodiment of the present invention.

DESCRIPTION OF THE PREFERRED EMBODIMENTS

Figure 1:
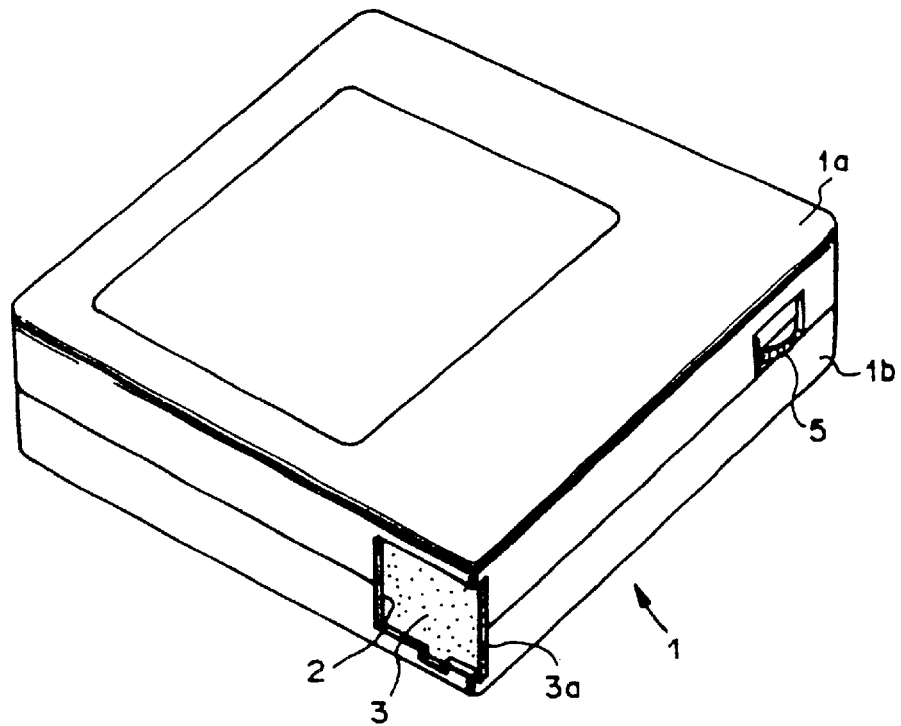
FIG. 1 is a perspective view showing a magnetic tape cartridge in accordance with a first embodiment of the present invention with the slide door closed.
Figure 2:
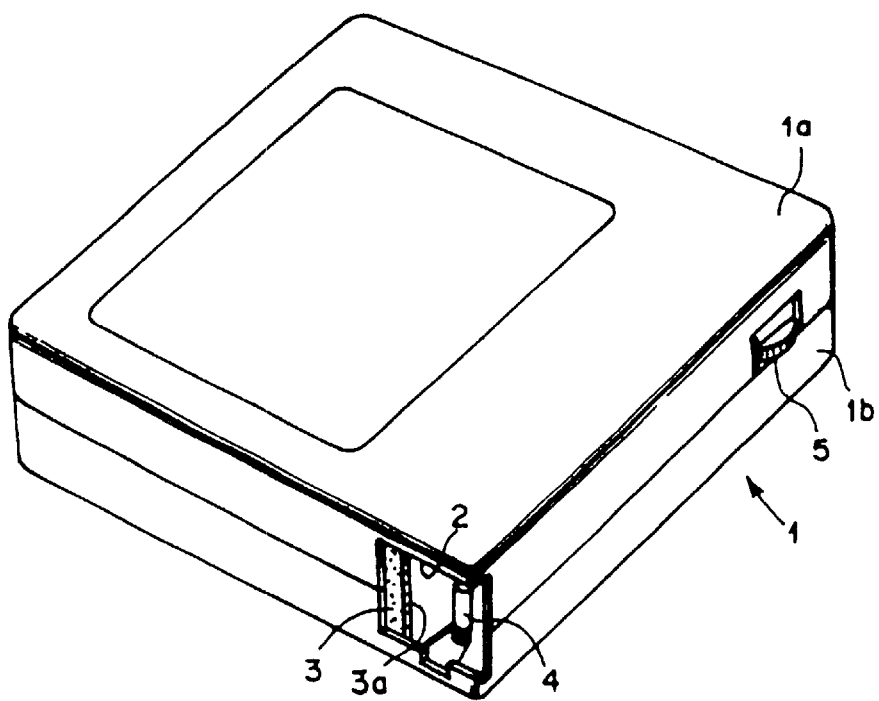
FIG. 2 is a perspective view showing the magnetic tape cartridge with the slide door opened.

A magnetic tape cartridge in accordance with a first embodiment of the present invention will be described with reference to FIGS. 1 to 9, hereinbelow. In FIGS. 1 and 2, the magnetic tape cartridge in accordance with the first embodiment of the present invention comprises a cartridge casing 1 formed by upper and lower casing halves 1a and 1b and a single reel (not shown) around which a magnetic tape is wound and which is supported for rotation in the cartridge casing 1. A tape outlet opening 2 through which the magnetic tape is drawn out is formed in one end face of the cartridge casing 1 near a corner thereof. A slide door 3 for opening and closing the tape outlet opening 2 is mounted in the cartridge casing 1 to be slidable back and forth between a closing position where it closes the tape outlet opening 2 and opening position where it opens the same. The slide door 3 is urged toward the closing position and held there by a spring disposed between a side face of the cartridge casing 1 and the rear end face of the slide door 3 as will be described in detail later.

As shown in FIG. 2, a leader pin 4 fixed to the leading end of the magnetic tape is held inside the tape outlet opening 2. When the magnetic tape cartridge is loaded in a tape drive system, a reel drive means of the tape drive system is brought into engagement with engagement teeth (not shown) on the reel which is exposed in the bottom face of the cartridge casing 1 at the center thereof and a tape drawing mechanism of the tape drive system pushes the front end face 3a of the slide door 3 to open the slide door 3. Further the tape drawing mechanism chucks the leader pin 4 and pulls the leader pin 4 into the system, whereby the magnetic tape is set in the tape drive system so that data can be recorded on or read out from the magnetic tape.

Figure 5:
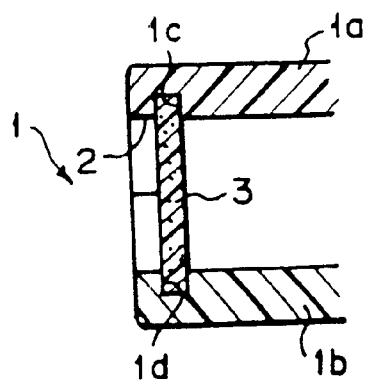
FIG. 5 is a cross-sectional view taken along line V—V in FIG. 4A.

A knob 5 for inhibiting erasure and write projects outside in one side face of the cartridge casing 1. As shown in FIG. 5, guide grooves 1c and 1d for guiding the upper end lower ends of the slide door 3 are formed on the upper and lower casing halves 1a and 1b.

Figure 3:
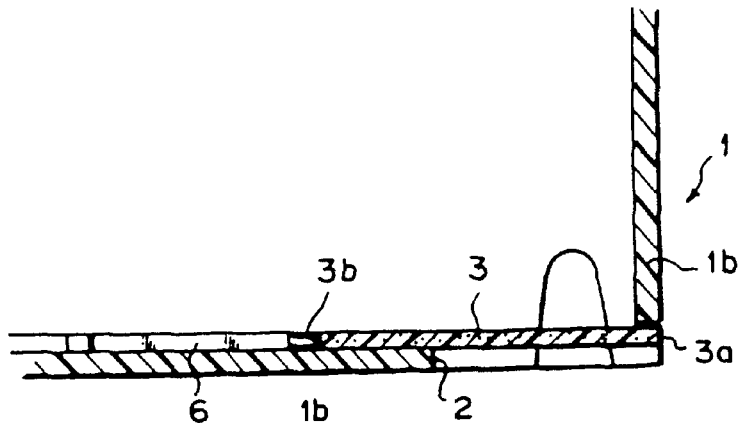
FIG. 3 is a fragmentary horizontal cross-sectional view showing the arrangement of the slide door and the door spring of the magnetic tape cartridge of the first embodiment.
Figure 4A:
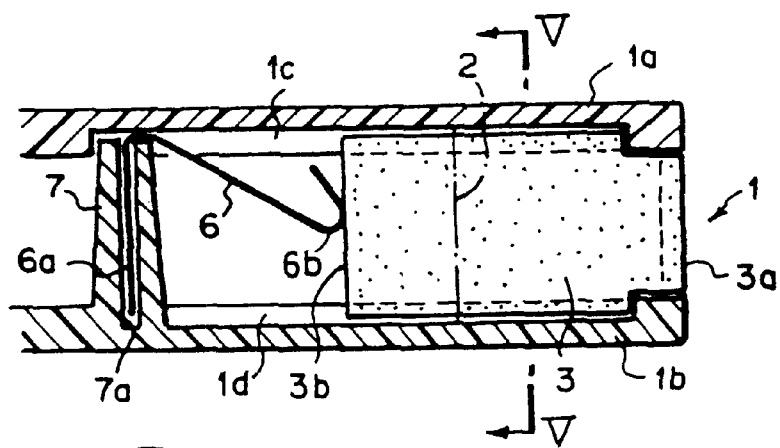
FIG. 4A is a fragmentary vertical cross-sectional view showing the arrangement of the slide door and the door spring with the slide door closed.
Figure 4B:
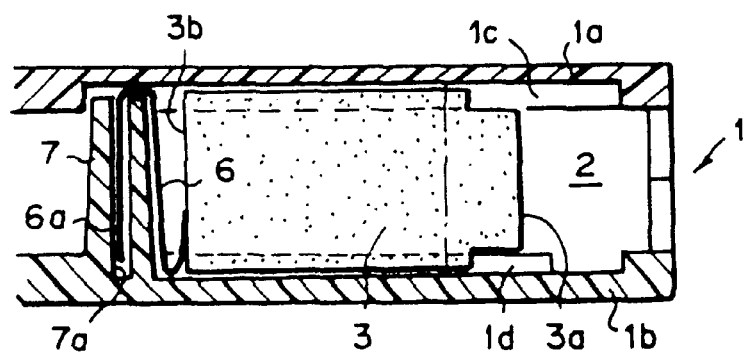
FIG. 4B is a fragmentary vertical cross-sectional view showing the arrangement of the slide door and the door spring with the slide door opened.

As shown in FIGS. 3, 4A and 4B, a door spring 6 for urging the slide door 3 toward the closing position and holding the slide door 3 in the closing position is provided in the passage of the slide door 3 inside the cartridge casing 1. The door spring 6 is a plate spring or a wire spring and one end portion 6a of the door spring 6 is held between the upper and lower casing halves 1a and 1b. More specifically, a rib 7 extends upward from the bottom of the lower casing 1b, and a hole 7a is formed in the rib 7. The door spring 6 comprises a vertical end portion (said one end portion) 6a, an arcuate end portion 6b and a horizontal middle portion connecting the end portions 6a and 6b. The vertical end portion 6a of the door spring 6 is inserted into the hole 7a so that the horizontal middle portion rests on the top of the rib 7 and the arcuate end portion 6b abuts against the rear end face 3b of the slide door 3 as shown in FIGS. 4A and 4B. A part of the upper casing half 1a is disposed in contact with or near the horizontal middle portion of the door spring 6, thereby holding the vertical end portion 6a in the hole 7.

Figure 6A:
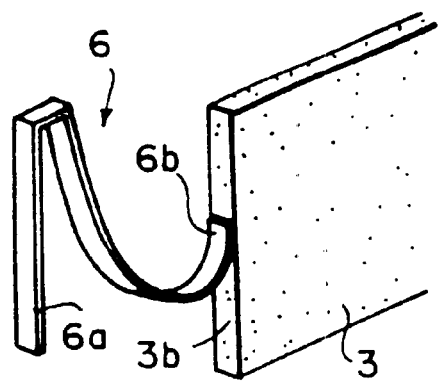
FIG. 6A is a perspective view showing the rear end face of the slide door and the door spring when the door spring is of a plate spring.
Figure 6B:
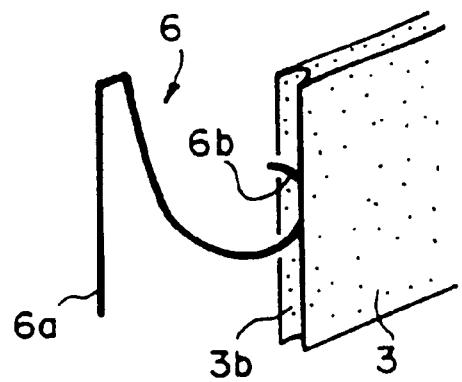
FIG. 6B is a perspective view showing the rear end face of the slide door and the door spring when the door spring is of a wire spring.

When the door spring 6 is a plate spring, the rear end face 3b of the slide door 3 may be flat as shown in FIG. 6A, but when the door spring 6 is a wire spring, it is preferred that the rear end face 3b of the slide door 3 be recessed as shown in FIG. 6B.

Figure 7A:
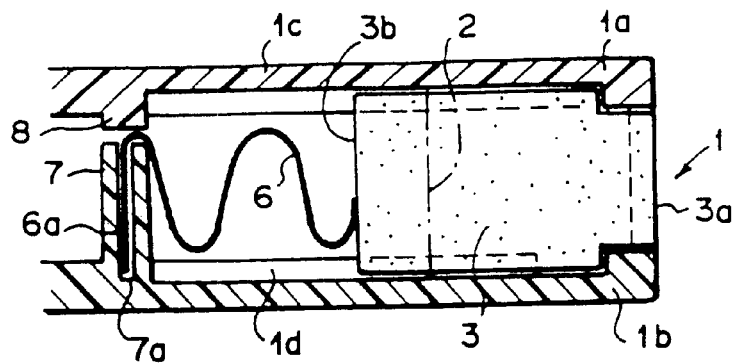
FIGS. 7A and 7B are views similar to FIGS. 4A and 4B but showing a modification of the arrangement of the slide door and the door spring.
Figure 7B:
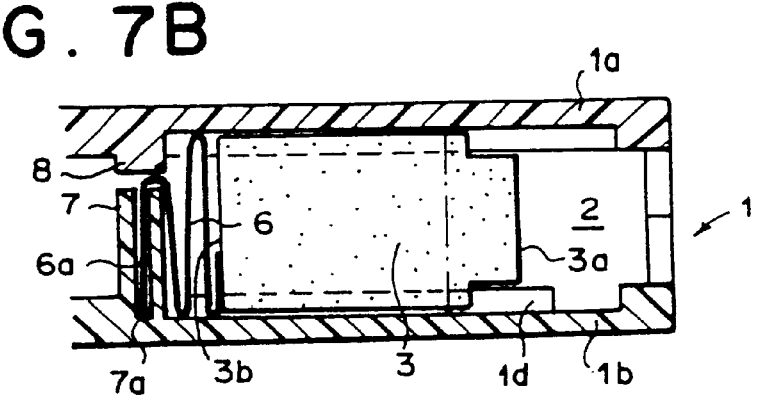

By increasing the parts of the door spring 6 which contributes to resiliency of the slide door 6 as shown in FIGS. 7A and 7B, the stroke of the slid e door 6 can be enlarged. In this case, a rib 8 may be formed on the upper casing half 1a to extend downward to hold the bight portion of the door spring 6 between the lower surface of the rib 8 and the upper surface of the rib 7 on the lower casing half 1b. Accordingly, the end portion of the door spring 6 can be held even if the end portion is not straight and even if the rib 7 is not provided with the hole 7a.

In either case, the door spring 6 can be incorporated in the cartridge casing 1 by simply positioning the door spring 6 in a predetermined position on the lower casing half 1b and fixing the upper casing half 1a onto the lower casing half 1b.

Figure 8:
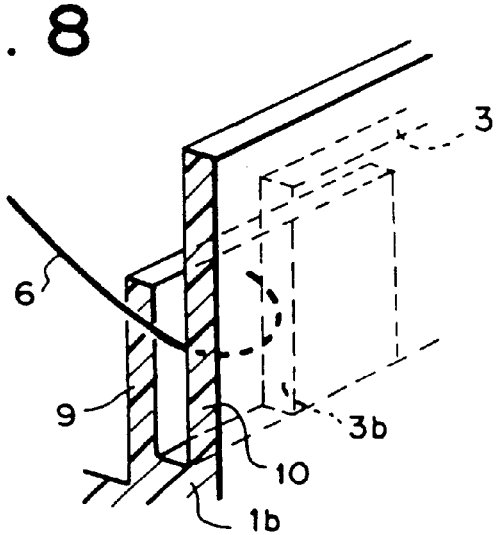
FIG. 8 is a modification of the spring holding structure which can be employed when the door spring is of a wire spring.
Figure 9:
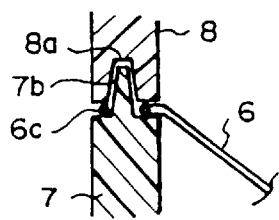
FIG. 9 is a modification of the spring holding structure which can be employed when the door spring is of a wire spring.

When a wire spring is employed as the door spring 6, an inner wall 9 of a predetermined height may be provided on the cartridge casing 1 along the passage of the slide door 3 so that the door spring 6 is constantly positioned between the inner wall 9 and a n outer wall 10 as shown in FIG. 8, whereby the door spring 6 can be prevented from being disengaged from the slide door 3.

Further when a wire spring is employed as the door spring 6, the door spring 6 may be held at its one end by fitting a loop 6c (FIG. 9) formed on its rear end portion on a projection 7b formed on the top of the rib 7 which is fitted in a recess 8a formed in the lower end face of the rib 8 extending downward from the upper casing half 1a.

A magnetic tape cartridge in accordance with a second embodiment of the present invention will be described with reference to FIGS. 10 to 12, hereinbelow.

Figure 11A:
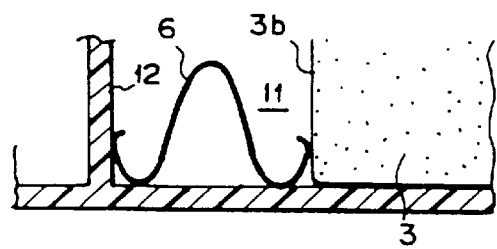
FIGS. 11A and 11B are vertical cross-sectional views showing the arrangement of the slide door and the door spring in the magnetic tape cartridge of the second embodiment.
Figure 11B:
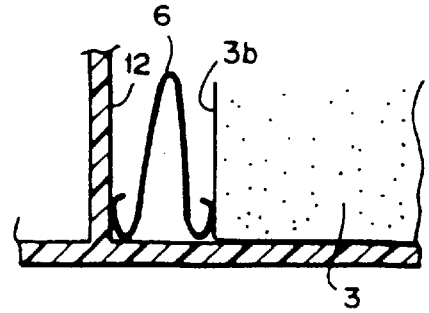
Figure 12:
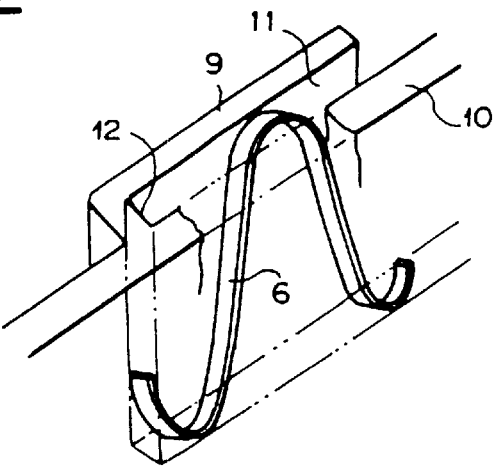
FIG. 12 is a fragmentary cross-section view showing the spring holding structure in the second embodiment.

In the second embodiment, an inner wall 9 is formed along the passage of the slide door 3 opposed to an outer wall 10 and a closed space 11 defining the passage of the slide door 3 is formed between the upper and lower casing halves 1a and 1b and the rear end face 3b of the slide door 3, and a door spring 6 in the form of a plate spring shaped as shown in FIGS. 11A and 11B is disposed inside the closed space 11 with its one end in abutment against the rear end face 12 of the closed space 11 and its the other end in abutment against the rear end face 3b of the slide door 3.

With this embodiment, the door spring 6 need not be held on the cartridge casing 1 but may be simply thrown in the closed space 11, and accordingly incorporation of the door spring 6 is extremely facilitated.

Figure 10:
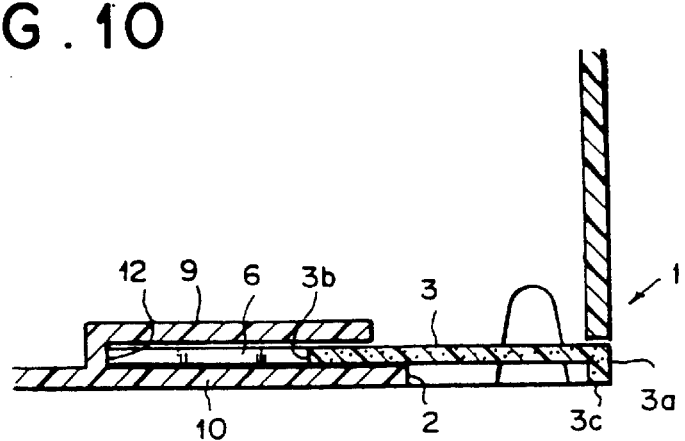
FIG. 10 is a view similar to FIG. 3 but showing a spring holding structure in a magnetic tape cartridge in accordance with a second embodiment of the present invention.

Further in this embodiment, the front end portion of the slide door 3 is bent outward in a L-shape as indicated at 3c in FIG. 10 so that the door opening means of the tape drive system can abut against the slide door 3 in a larger area and the slide door 3 can be surely opened.

Figure 13:
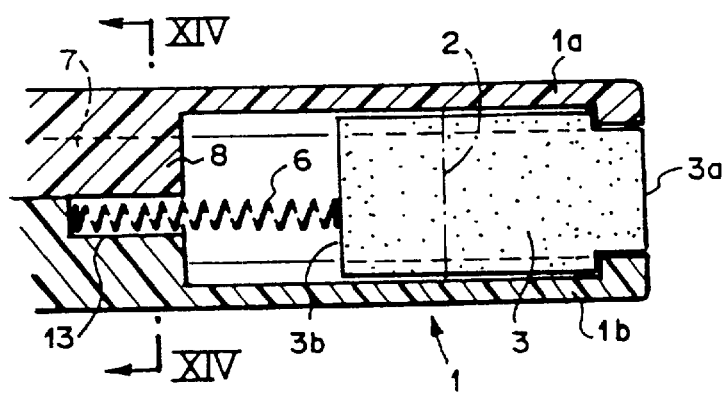
FIG. 13 is a vertical cross-sectional view showing the arrangement of the slide door and the door spring in a magnetic tape cartridge of a third embodiment of the present invention.
Figure 14:
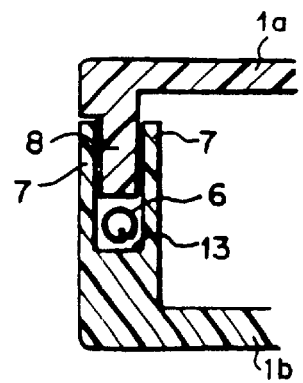
FIG. 14 is a cross-sectional view taken along line XIV—XIV in FIG. 13.

In addition to the wire spring and the plate spring, a coiled spring may be employed as the door spring 6. In the third embodiment shown in FIGS. 13 and 14, the door spring 6 is in the form of a coiled spring and is held in place by forming an elongated space 13 which extends in parallel to the direction of movement of the slide door 3 between a rib 7 extending upward from the lower casing half 1b and a rib 8 extending downward from the upper casing half 1a and inserting the rear end portion of the door spring 6 into the elongated space 13.

Figure 15:
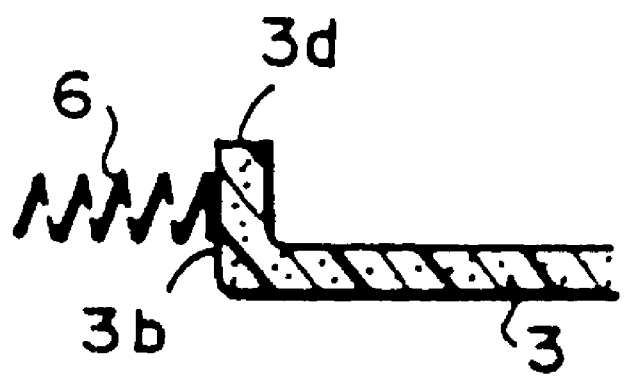
FIG. 15 is a fragmentary cross-sectional view showing a modification of the arrangement of the slide door and the door spring in the third embodiment.

Further when a coiled spring is employed as the door spring 6, the rear end portion of the slide door 3 may be bent in a L-shape as indicated at 3d in FIG. 15 so that the door spring 6 can abut against the slide door 3 in a larger area.

A magnetic tape cartridge in accordance with a fourth embodiment of the present invention will be described with reference to FIGS. 16A, 16B, 17A and 17B, hereinbelow.

As shown in FIGS. 16A, 16B, 17A and 17B, in this embodiment, the slide door 3 is urged toward the closing position and held there by a corrugated door spring 6. P denotes the passage of the slide door 3. The slide door 3 is provided with a recess 3a which extends toward the front end face 3a of the slide door 3 from the read end face 3b. The front half of the corrugated door spring 6 is inserted into the recess 3c with the rear end of the door spring 6 abutting against the rear inner surface 1e of the cartridge casing 1 and the front end of the door spring 6 abutting against the bottom surface 3d of the recess 3c.

Figure 16A:
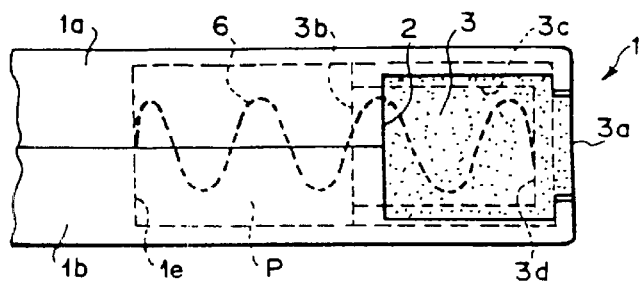
FIGS. 16A and 16B are views similar to FIGS. 4A and 4B but showing a fourth embodiment of the present invention.
Figure 16B:
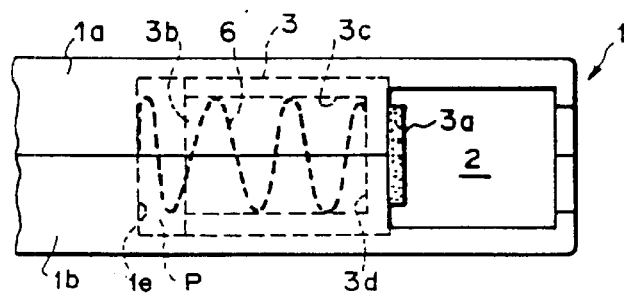
Figure 17A:
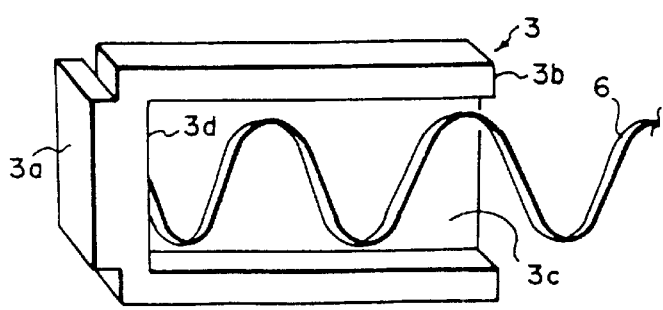
FIGS. 17A and 17B are a rear perspective view and a rear side view of the slide door in the fourth embodiment.
Figure 17B:
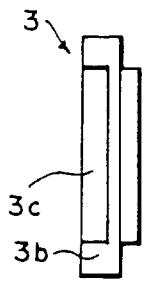

With this arrangement, even in the state where the slide door 3 is opened and the distance between the rear end face 3b of the slide door 3 and the rear inner surface 1e of the cartridge casing 1 is shortened with the door spring 6 compressed as shown in FIG. 16B, the door spring 6 can exhibit a desired urging force.

Figure 18A:
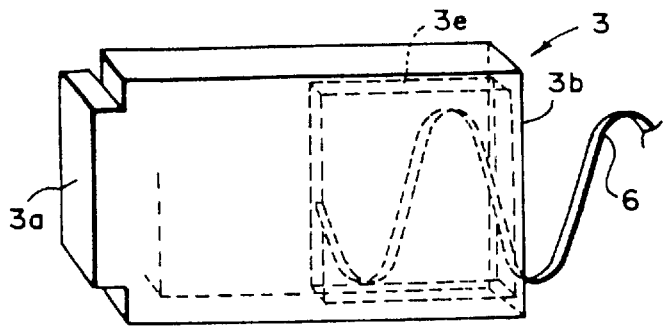
FIGS. 18A and 18B are views similar to FIGS. 17A and 17B but showing a modification of the arrangement of the slide door and the door spring.
Figure 18B:
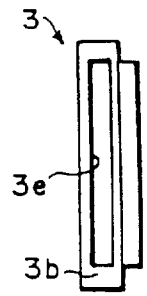

A recess 3e which opens only in the rear end face 3b of the slide door 3 as shown in FIGS. 18A and 18B may be formed instead of the recess 3c which opens both in the rear end face 3b and a side face of the slide door 3.

Figure 19:
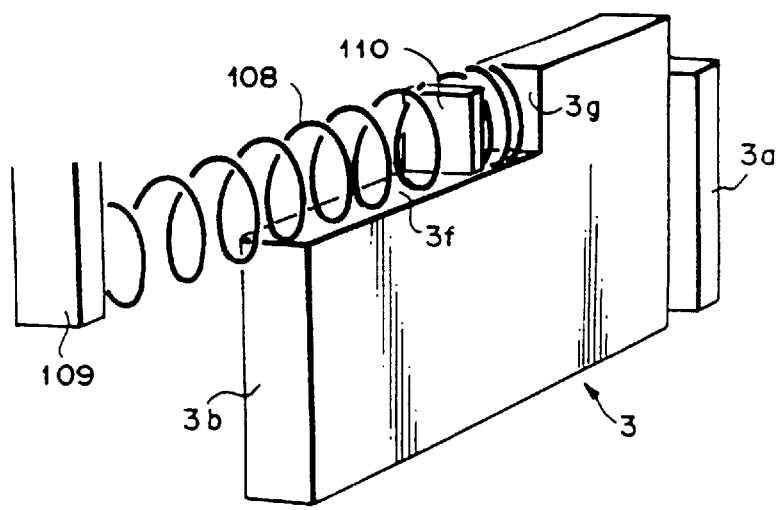
FIG. 19 is a perspective view showing the arrangement of the slide door and the door spring in a fifth embodiment.

In a fifth embodiment of the present invention shown in FIG. 19, a cutaway portion 3f is formed on an upper part of the slide door 3 and the front half of a coiled door spring 108 is placed on the cutaway portion 3f. The front end of the door spring 108 is in abutment against the front end face 3g of the cutaway portion 3f and the rear end of the door spring 108 is in abutment against a wall portion 109 formed on the upper casing half 1a. Reference numeral 10 denotes a rib for tacking the door spring 108.

Figure 20A:
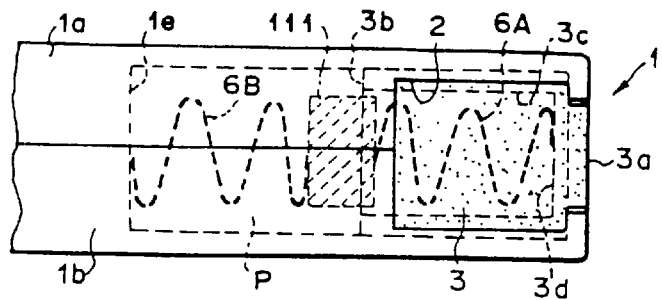
FIGS. 20A and 20B are views similar to FIGS. 4A and 4B but showing a sixth embodiment of the present invention.
Figure 20B:
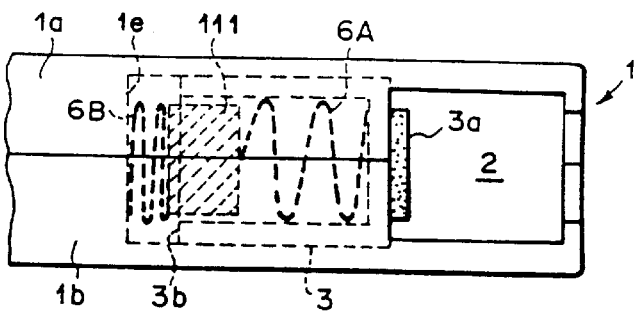

The sixth embodiment shown in FIGS. 20A and 20B is differs from the fourth embodiment shown in FIGS. 16A, 16B, 17A and 17B in that the door spring 6 is formed by a pair of spring members 6A and 6B connected in series with a slide plate 111 intervening therebetween and the front spring member 6A is larger that the rear spring member 6B in the urging force.

In this embodiment, when the slide door 3 is opened overcoming the force of the door spring 6, the rear spring member 6B, which is weaker than the front spring member 6A, is first compressed and then the front spring member 6A is compressed, whereby a relatively constant spring characteristic can be obtained over the entire stroke of the slide door 3, and adjustment of the door opening force can be facilitated.

Figure 21A:
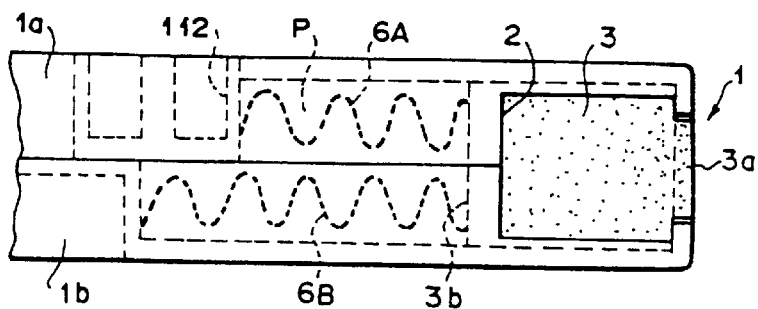
FIGS. 21A and 21B are views similar to FIGS. 4A and 4B but showing a seventh embodiment of the present invention.
Figure 21B:
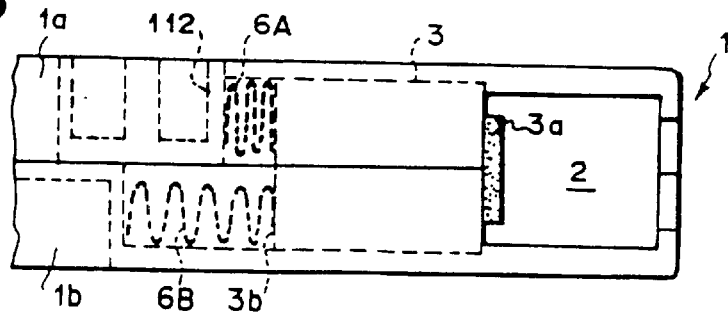

In the seventh embodiment shown in FIGS. 21A and 21B, the door spring 6 is formed by a pair of spring members 6A and 6B which are disposed in parallel in the passage P of the slide door 3 and the upper spring member 6A is shorter than the lower spring member 6B.

In this embodiment, for example when an obstacle such as a recess 112 exists in the upper casing half 1a, a short and narrow spring member 6A is disposed in the upper casing half 1a and a long and narrow spring member 6B is disposed in the lower casing half 1b, whereby a desired urging force is obtained in total.

Figure 22A:
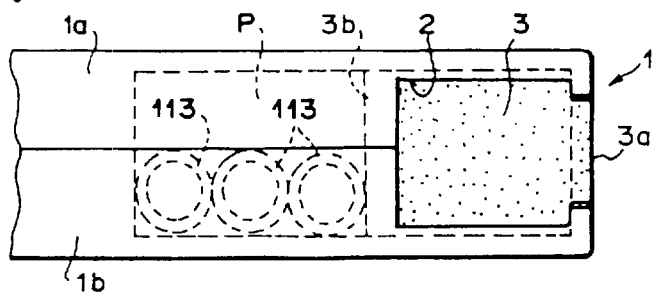
FIGS. 22A and 22B are views similar to FIGS. 21A and 21B but showing an eighth embodiment of the present invention.
Figure 22B:
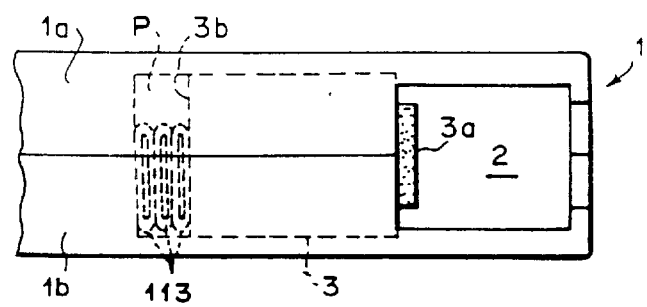

In the eighth embodiment shown in FIGS. 22A and 22B, the door spring 6 is formed by a plurality (three in the illustrated embodiment) of elastic rings 113 such as rubber rings arranged in series in the slide door passage P.

The elastic rings are easy to produce and since they keeps an urging force until they compressed flat as shown in FIG. 22B, a door spring having a long stroke and a desired urging force can be easily obtained.

Figure 23A:
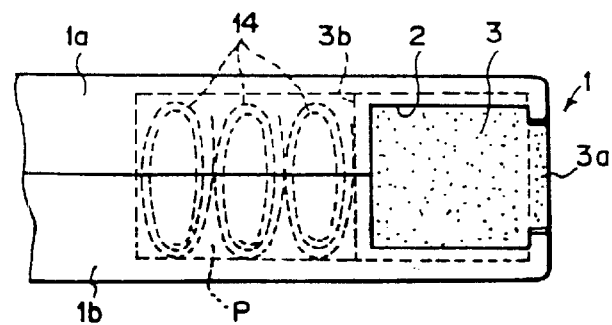
FIGS. 23A and 23B are views similar to FIGS. 21A and 21B but showing a ninth embodiment of the present invention.
Figure 23B:
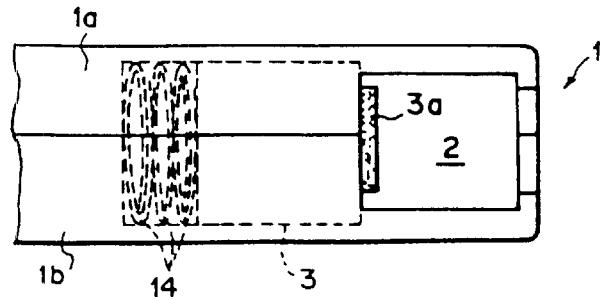

The ninth embodiment shown in FIGS. 23A and 23B is similar to the eighth embodiment but a plurality of helical elastic members 14 are employed in place of the elastic rings 113.

In the tenth embodiment shown in FIGS. 24A to 24D, a corrugated wire spring 16 having a pair of coiled portions 16a and 16b is used as a door spring 6.

Figure 24A:
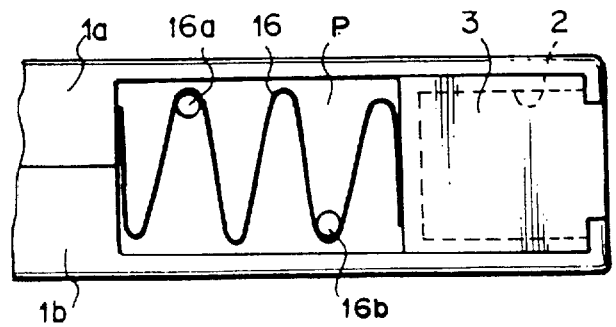
FIGS. 24A to 24D are front views of the arrangement of the door spring and the slide door in a magnetic tape cartridge in accordance with a tenth embodiment of the present invention with the slide door in different positions.
Figure 24B:
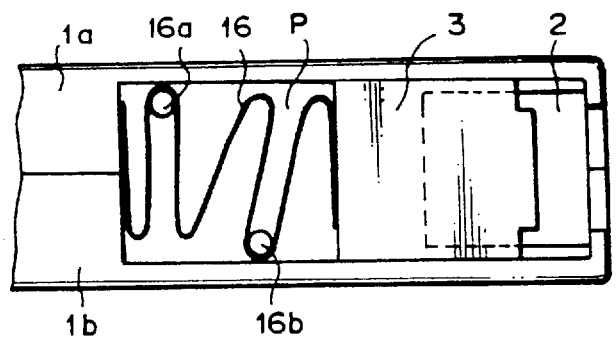
Figure 24C:
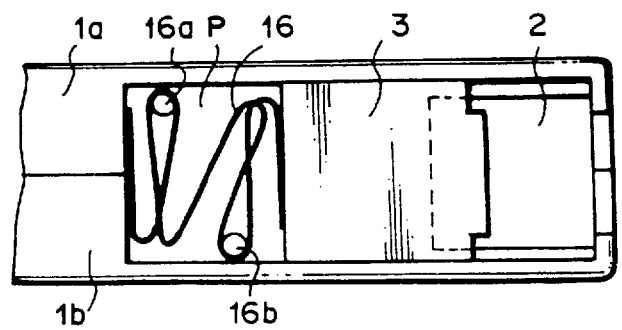
Figure 24D:
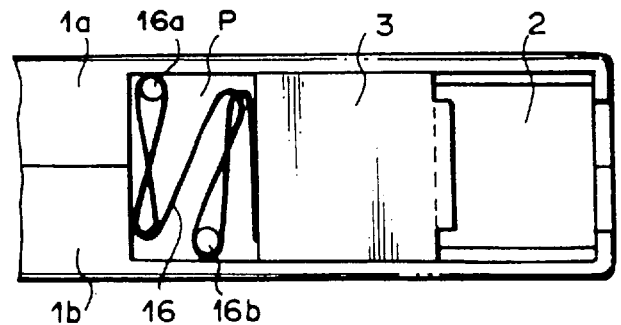

In this embodiment, when the slide door 3 is opened and as the wire spring 16 is increasingly compressed, bent portions of the wire spring 16 are rotated about the coiled portions 16a and 16b and come to cross each other as shown in FIGS. 24B to 24D, whereby a long stroke can be obtained.

The wire spring 16 may be provided with a single or three or more coiled portions. By changing the number of the coiled portions, a spring member 16 having a desired spring characteristics can be obtained. Further by changing the number of turns of the coiled portion, a spring member 16 having a desired spring characteristics can also be obtained.

A magnetic tape cartridge in accordance with an eleventh embodiment of the present invention will be described with reference to FIGS. 25 (25A and 25B) to 28, hereinbelow. In this embodiment, a pair of coiled springs 20 are employed as the door spring 6.

Since the slide door 3 is slid over a relatively long distance, there is fear that the coiled springs 20 buckles when the slide door 3 is opened. In this embodiment, buckling of the coiled springs 20 is prevented by mounting a spring retainer plate 18 on the rear end of the slide door 3.

Figure 26:
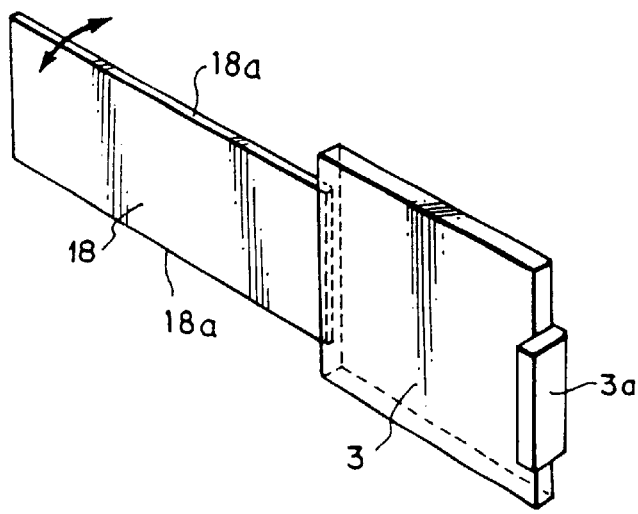
FIG. 26 is a perspective view of the slide door employed in the eleventh embodiment.

That is, as shown in FIG. 26, the spring retainer plate 18 has upper and lower edges 18a which are substantially parallel to the direction of sliding movement of the slide door 3 and is mounted on the rear end of the slide door 3 to extend in the door passage P.

Figure 25A:
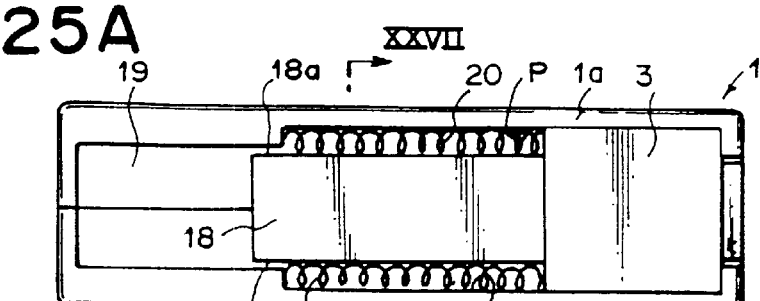
FIGS. 25A and 25B are views similar to FIGS. 21A and 21B but showing a eleventh embodiment of the present invention.
Figure 25B:
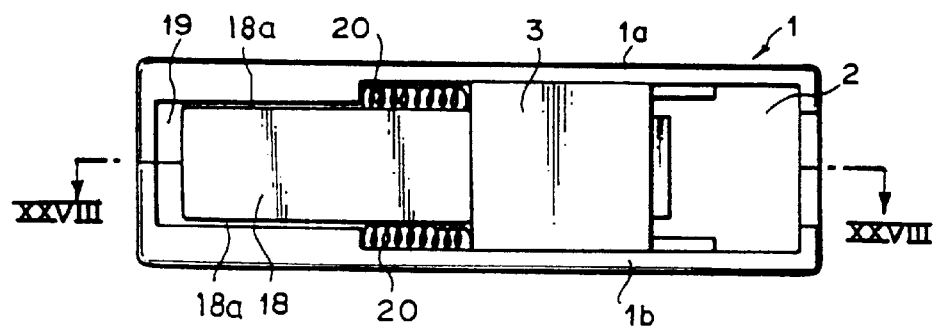
Figure 27:
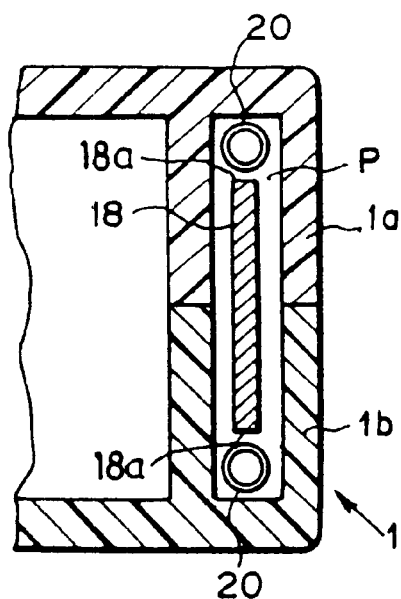
FIG. 27 is a cross-sectional view taken along line XXVII—XXVII in FIG. 25A.

Further, as shown in FIGS. 25A and 25B, the slide door passage P is provided with an extension 19 which is narrower than the slide door passage P and extends away from the slide door 3. The spring retainer plate 18 is narrower than the slide door 3 and is inserted into the extension 19. Then as shown in FIG. 27, the coiled springs 20 are contained in the spaces surrounded by the upper and lower edges 18a of the spring retainer plate 18 and the walls of the slide door passage P.

Accordingly, even if the coiled springs 20 are compressed in response to opening the slide door 3, the coiled springs 20 cannot buckle and can keep their longitudinal axes in the direction of sliding movement of the slide door 3.

Figure 28:
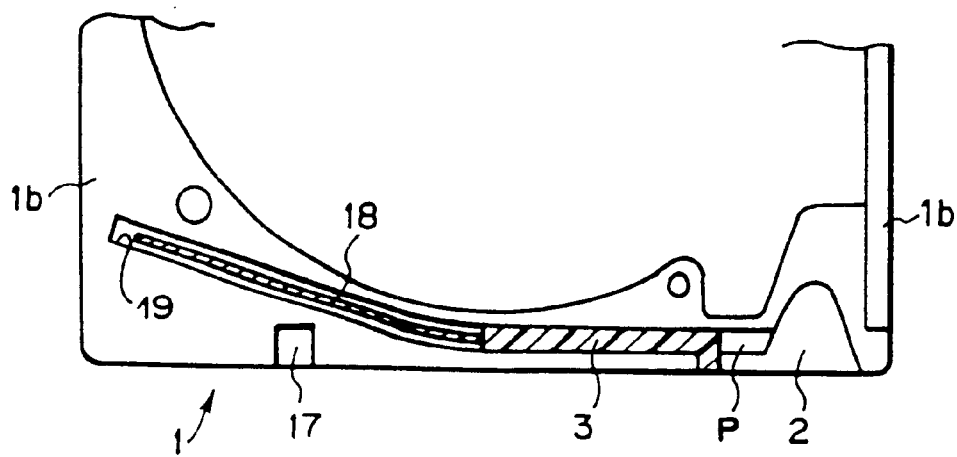
FIG. 28 is a cross-sectional view taken along line XXVIII—XXVIII in FIG. 25B, FIGS. 29A and 29B are views similar to FIGS. 21A and 21B but showing a twelfth embodiment of the present invention.

Further since a locator notch 17 and the like are generally positioned behind the slide soor passage P, the extension 19 is curved inward to clear the notch 17 and the spring retainer plate 18 is formed of a flexible material so that it can slide along the curved extension 19 as shown in FIG. 28.

Figure 29A:
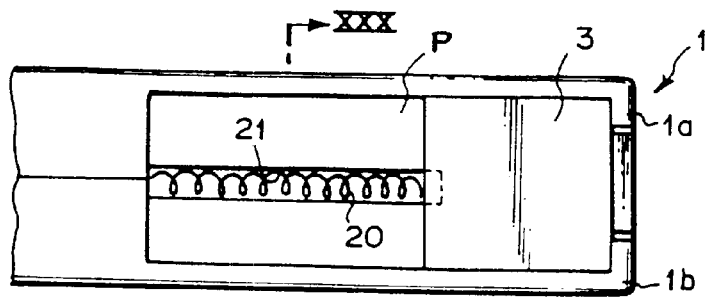
Figure 29B:
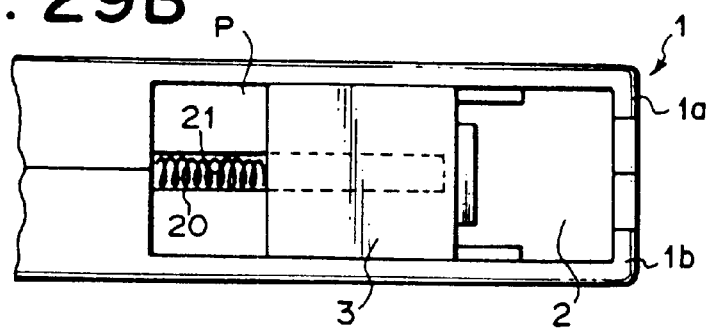
Figure 30:
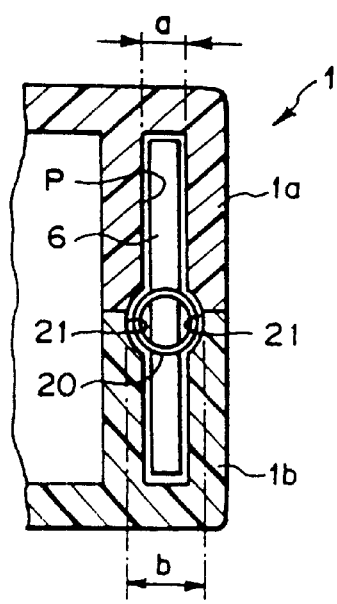
FIG. 30 is a cross-sectional view taken along line XXX—XXX in FIG. 29A.

In the twelfth embodiment shown in FIGS. 29A, 29B and 30, a single coiled spring 20 is employed as the door spring. A pair of grooves 21 are formed on opposite side walls of the slide door passage P opposed to each other as shown in FIG. 30. BY the grooves 21, a space for containing the coiled spring 20 having a width b larger than the space a between the side walls is defined and the coiled spring 20 is contained in the space.

With this arrangement, not only buckling of the coiled spring 20 is prevented but also freedom of selecting the coiled spring 20 is increased since a coiled spring larger than the space a in diameter can be used.

Figure 31:
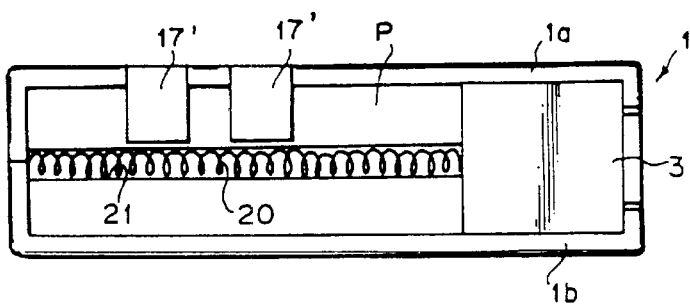
FIG. 31 is a view for illustrating the effect of the twelfth embodiment.
Figure 32A:
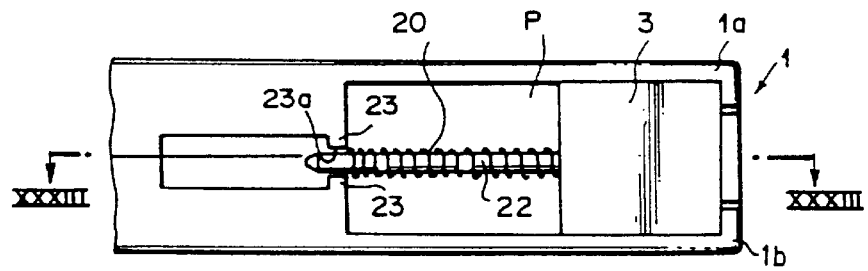
FIGS. 32A and 32B are views similar to FIGS. 21A and 21B but showing a thirteenth embodiment of the present invention.
Figure 32B:
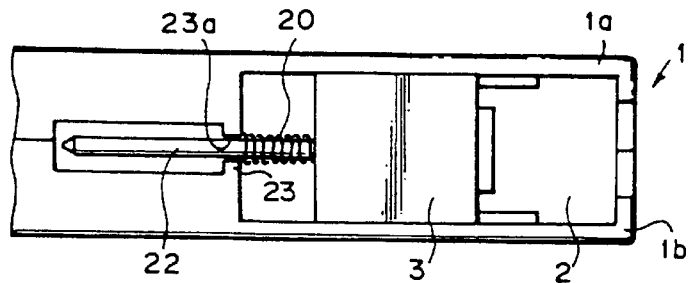
Figure 33:
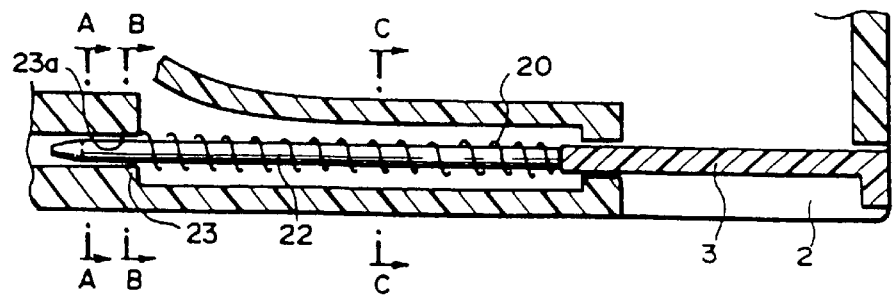
FIG. 33 is a cross-sectional view taken along line XXXIII—XXXIII in FIG. 32A, FIGS. 34A to 34C are cross-sectional views taken along lines A—A, B—B and C—C in FIG. 33, FIGS. 35A and 35B are views for illustrating the effect of the thirteenth embodiment.

Further even if notches 17' for locating or handling the magnetic tape cartridge are disposed behind the slide door passage P, the coiled spring 20 can extend along the entire length of the cartridge casing 1 as shown in FIG. 31.

The grooves 21 may be formed between the upper and lower casing halves 1a and 1b. However, by forming a main part of the groove 21 in one of the upper and lower casing 1a and 1b as shown in FIG. 30, the cartridge casing 1 can be assembled with the coiled spring 20 held in the casing half where the main part of the groove 21 is formed, assembly of the cartridge casing 1 is facilitated.

In the thirteenth embodiment shown in FIGS. 32A, 32B, 33, 34A, 34B and 34C, a coiled spring 20 is also employed and buckling of the coiled spring 20 is prevented by a spring support rod 22.

That is, the spring support rod 22 extends rearward from the read end of the slide door 3 and the coiled spring 20 is fitted on the rod 22.

Also in this embodiment, a pair of grooves 21 are formed on opposite side walls of the slide door passage P opposed to each other as shown in FIG. 34C. BY the grooves 21, a space for containing the coiled spring 20 having a width larger than the space between the side walls is defined and the coiled spring 20 is contained in the space.

With this arrangement, not only buckling of the coiled spring 20 is prevented but also freedom of selecting the coiled spring 20 is increased since a colied spring larger than the space in diameter can be used. A wall 23 is formed in the cartridge casing 1 to form a spring seat behind the slide door passage P and the spring support rod 22 is inserted into an axial hole 23a formed in the wall 23. It is preferred that the spring support rod 22 be provided with a pair of flat surfaces on opposite sides thereof and the axial hole 23a conforms to the rod 22 in shape as shown in FIGS. 34A to 34C. With this arrangement, the end of the coiled spring 22 from entering the space between the axial hole 23a and the rod 22 and since the area of the spring seat is increased, the end of the coiled spring 20 can be stably supported.

By virtue of the spring support rod 22, the coiled spring 22 can be easily incorporated in, for instance, the lower casing half 1b as shown in FIG. 35A. However without the spring support rod 22, the coiled spring 20 is apt to buckle as shown in FIG. 35B when incorporating in the lower casing half 1b, which makes difficult incorporation of the coiled spring 20.

Figure 37:
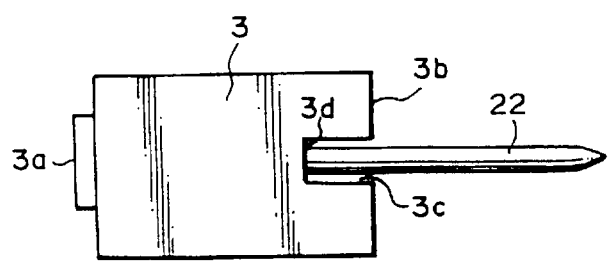
FIG. 37 is a front view of the slide door in the modification shown in FIG. 36.

When a recess 3c is formed on the rear end face of the slide door 3, the spring support rod 22 projects from the bottom surface 3d of the recess 3c, and the coiled spring 20 is fitted on the rod 22 with one end in contact with the bottom surface 3d and the other end in contact with the inner wall surface 1e of the cartridge casing 1 as shown in FIGS. 36 and 37, the stroke of the coiled spring 20 can be increased and the freedom of selecting the coiled spring can be enlarged.

Figure 38:
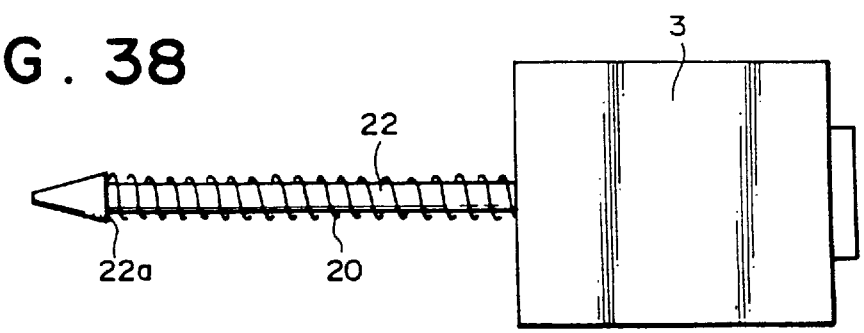
FIG. 38 is a front view showing a modification of the spring support rod.

Further by providing a shoulder 22a on the tip of the spring support rod 22 as shown in FIG. 38 and tacking the coiled spring on the rod 22, incorporation of the coiled spring 20 is facilitated. When the tip portion of the rod 22 is smaller in diameter than the body portion of the rod 22, fitting the coiled spring on the rod 22 by an automated assembling system is facilitated.

Figure 39A:
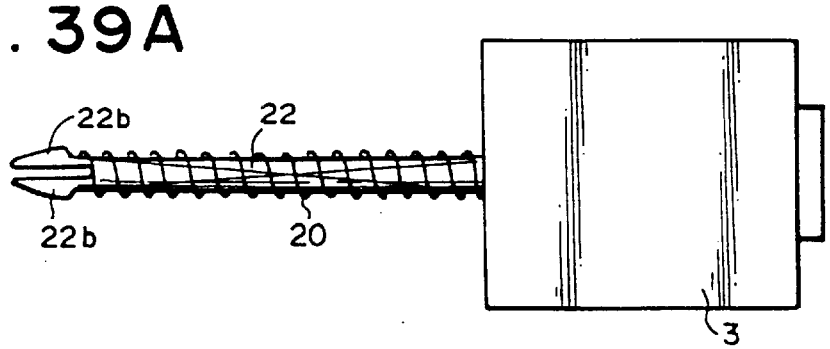
FIGS. 39A to 39C are front views showing a modification of the spring support rod shown in FIG. 38.
Figure 39B:
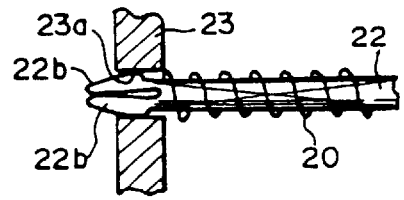
Figure 39C:
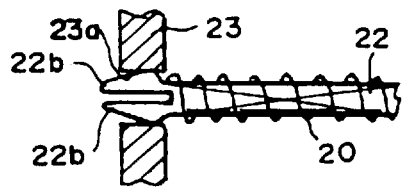

It is preferred than the tip portion be bifurcated into a pair of resilient pieces 22b as shown in FIG. 39A. In this case, the rod 22 can be easily inserted into the axial hole 23a by virtue of resilient deformation of the resilient pieces 22b even if the axial hole 23a is small as shown in FIG. 39B.

The axial holes 23a may be of such a diameter that permits insertion of the rod 22 without deformation of the resilient pieces 22b as shown in 39C. Also in this case, by providing the spring support rod 22 with a pair of flat surfaces on opposite sides thereof and shaping the axial hole 23a to conform to the rod 22 in shape, the end of the coiled spring 20 can be stably supported by the wall 23.

Further by providing the coiled spring 20 with a plurality of close winding portions 20a as shown in FIG. 40, rigidity of the coiled spring 20 is increased, which contributes to prevention of buckling of the coiled spring 20.

Though it is preferred that the spring support rod 22 be formed integrally with the slide door 3 so that the number of parts is reduced, the rod 22 may be formed separately from the slide door 3 as shown in FIGS. 41A to 41C. FIG. 41C is a fragmentary plan view of an important part of the rod 22, FIG. 41B is a side view of the rod 22 and FIG. 41C is a fragmentary cross-sectional view of an important part of the slide door 3. The rod 22 comprises a body portion 22c having a tip portion such as shown in FIG. 39A, a small diameter portion 22d formed near the base end of the body portion 22c and a base end portion 22e connected to the small diameter portion 22d as shown in FIG. 41A. The base end portion 22e is provided with a pair of flat portions on opposite sides thereof as shown in FIG. 41B in order to prevent rotation of the rod 22. The rear end portion of the slide door 3 is provided with an engagement recess 24 which conforms to the shape of the base end portion 22e of the rod 22 as shown in FIG. 41C. After the coiled spring 20 is fitted on the rod 22 from the base end portion 22e, the base end portion 22e is brought into engagement with the recess 24 of the slide door 3 from above, whereby the rod 22 is fixed to the slide door 3 as shown in FIG. 42.

Figure 43:
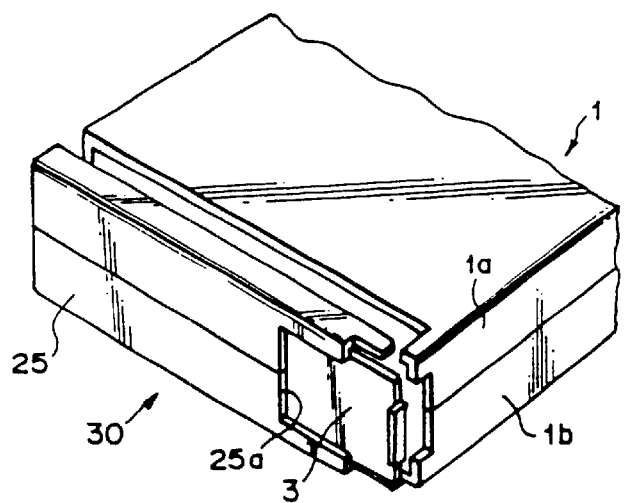
FIG. 43 is a perspective view showing incorporation of a door unit in the cartridge casing in a fourteenth embodiment of the present invention.

A fourteenth embodiment of the present invention will be described with reference to FIGS. 43, 44A, 44B and 45, hereinbelow. FIG. 43 is a perspective view showing incorporation of a door unit in the cartridge casing, FIG. 44A is a front cross-sectional view showing the door unit in a state where the slide door is in a tacked state, FIG. 44B is a front cross-sectional view showing the door unit in a state where the slide door is slidable, and FIG. 45 is a cross-sectional view taken along line A—A in FIG. 44B.

In this embodiment, the side walls of the cartridge casing 1 on which the slide door 3 is to be mounted is removed and a door unit 30 is mounted on the side of the cartridge casing 1. The door unit 30 comprises a casing 25 and a slide door 3 and a plurality of coiled springs 20 incorporated in the casing 25 and is fixed to the cartridge casing 1 by bonding or press-fitting. The casing 25 is provided with an opening 25a which forms the tape outlet opening 2.

The door unit 30 is provided with a tacking mechanism for holding the slide door 3 not to be ejected from the casing 25 under the force of the coiled springs 20 after the coiled springs 20 are incorporated in the casing 25.

Figure 44A:
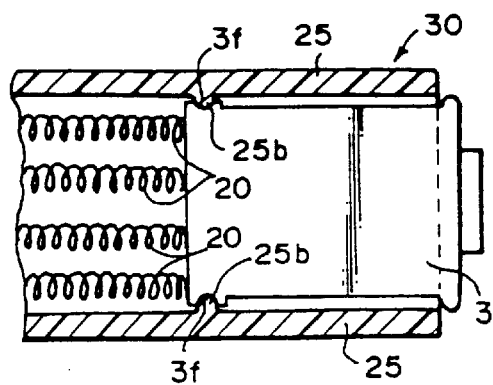
FIG. 44A is a front cross-sectional view showing the door unit in a state where the slide door is in a tacked state.
Figure 44B:
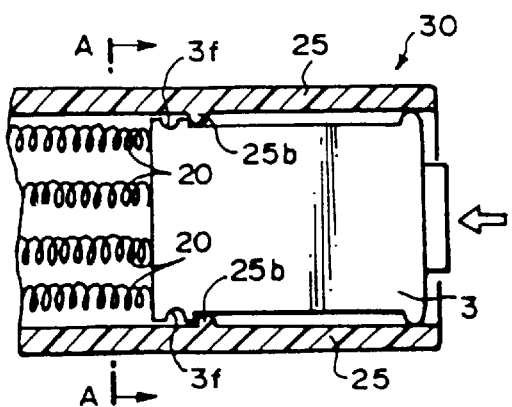
FIG. 44B is a front cross-sectional view showing the door unit in a state where the slide door is slidable.
Figure 45:
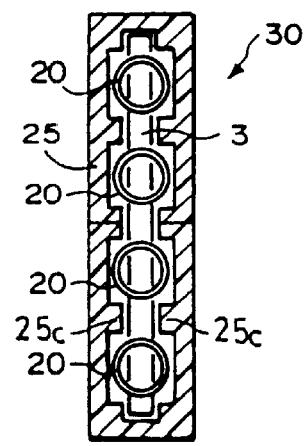
FIG. 45 is a cross-sectional view taken along line A—A in FIG. 44B.

As shown in FIGS. 44A and 44B, the tacking mechanism comprises a pair of engagement projections 25b formed on the top surface and the bottom surface of the slide door passage and a pair of engagement recesses 3f formed on the upper and lower edges of the slide door 3. After the coiled springs 20 are incorporated in the slide door passage, the slide door 3 is inserted into the slide door passage from the opening at the right side end of the casing 25 to a position where the engagement projections 25b and the engagement recesses 3f are brought into engagement with each other as shown in FIG. 44A. Thus the slide door 3 is tacked and the door unit 30 is incorporated in the cartridge casing 1 in this state. Then by pushing leftward the slide door 3 to disengage the engagement projections 25b and the engagement recesses 3f from each other as shown in FIG. 44B, the slide door 3 comes to be slidable.

In order to more stabilize the sliding movement of the slide door 3, a plurality of ribs 25c extending in the direction of the sliding movement of the slide door 3 are formed on opposite sides of the slide door passage as shown in FIG. 45.

Figure 46A:
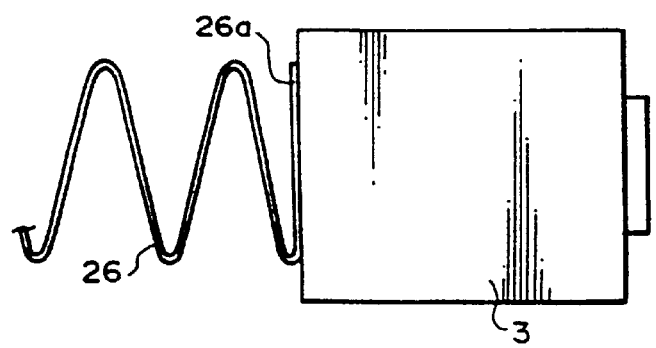
FIG. 46A is a front view showing the door spring and the slide door in a magnetic tape cartridge in accordance with a fifteenth embodiment of the present invention.
Figure 46B:
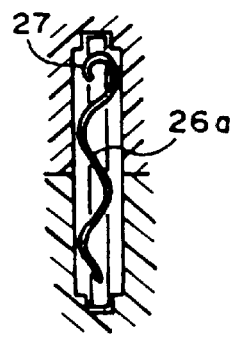
FIG. 46B is a cross-sectional view of the door spring and the slide door.

In the fifteenth embodiment shown in FIGS. 46A and 46B, a corrugated wire spring 26 is employed as the door spring. In order to prevent the end portion of the wire spring 26 from entering the space between the slide door 3 and the inner surface of the cartridge casing 1, the end portion of the wire spring 26 is bent along the rear end face of the slide door 3 to form a bent portion 27 as shown in FIG. 46B.

Figure 47A:
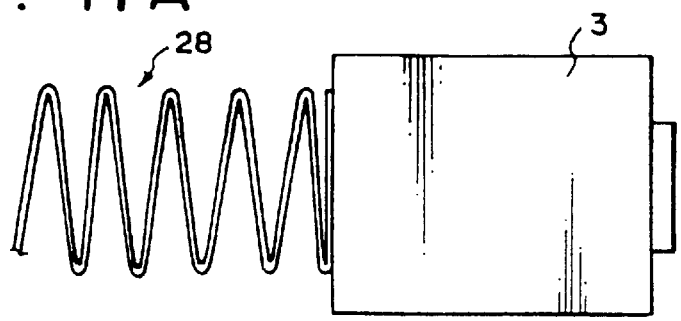
FIG. 47B is a perspective view of the door spring.
Figure 47B:
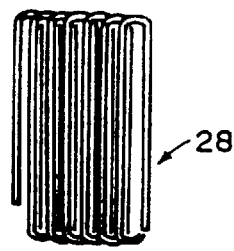

In the sixteenth embodiment shown in FIGS. 47A and 47B, a coiled spring 28 provided with an annular portion which is of a rectangle or ellipsoid conforming to the cross-sectional shape of the slide door 3 as shown in FIG. 47B is employed as the door spring. With this arrangement, buckling of the coiled spring 28 is pre vent ed and incorporation of the spring 28 is facilitated.

Figure 48A:
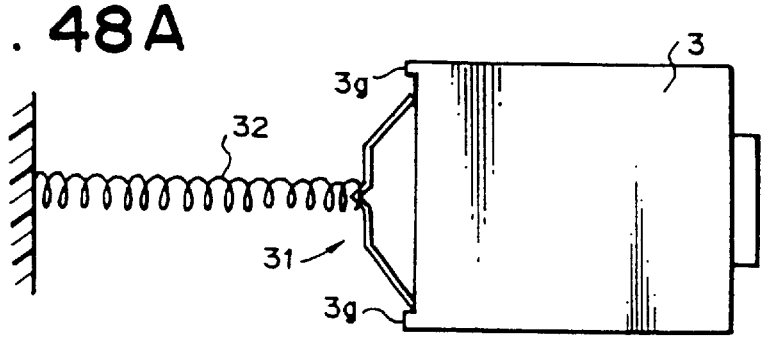
FIG. 48A is a front view showing the door spring and the slide door in a magnetic tape cartridge in accordance with a seventeenth embodiment of the present invention.
Figure 49:
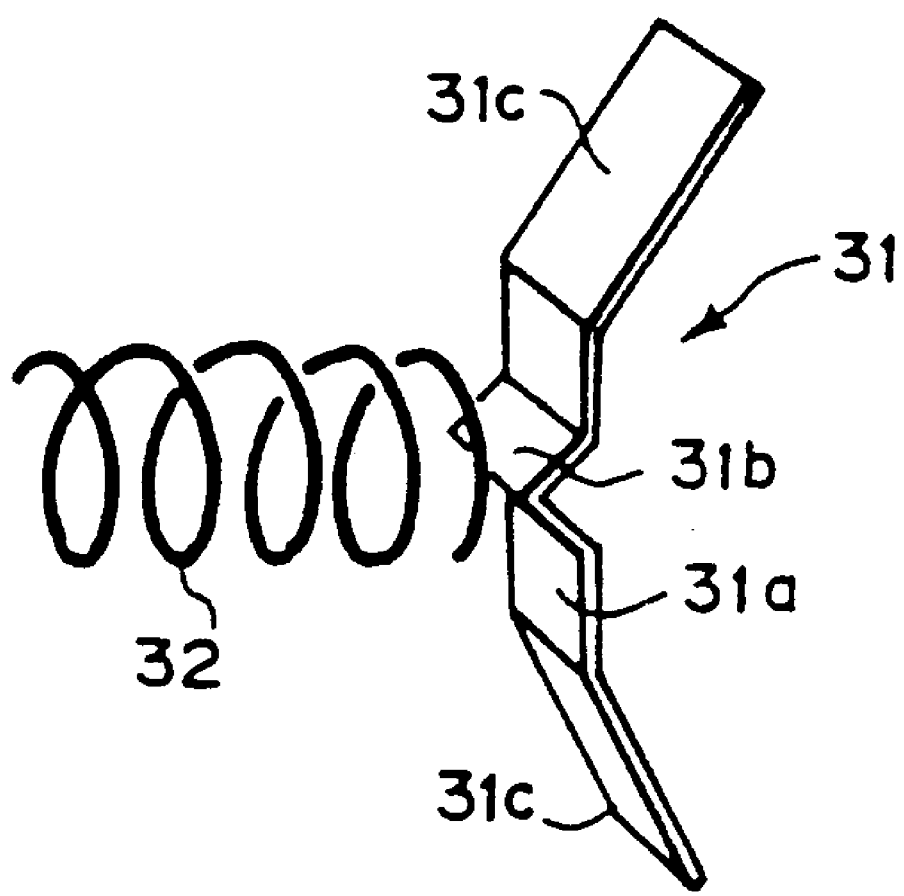
FIG. 49 is an exploded perspective of the spring shown in FIG. 48A, FIGS. 50A to 50C are views for illustrating the effect of the seventeenth embodiment.

In the seventeenth embodiment shown in FIGS. 48A and 49, the door spring is formed by a coiled spring 32 and a plate spring 31 is connected to one end of the coiled spring 32. The plate spring 31 comprises a central portion 31a provided at its center with an engagement projection 31b with which the end of the coiled spring 32 is engaged and a pair of wings 31c which extend toward the slide door 3 form opposite ends of the central portion 31a. The end portions of the wings 31c are engaged with engagement projections 3g formed on the upper and lower edges of the slide door 3.

Figure 48B:
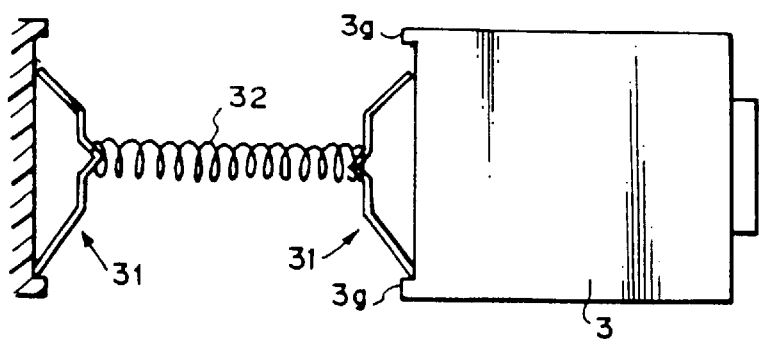
FIG. 48B is a front view showing a modification of the door spring and the slide door shown in FIG. 48A.

The plate spring 31 may be provided on each end of the coiled spring 32 as shown in FIG. 48B.

In this embodiment, the coiled spring 32 may be smaller in length by the length of the plate spring 31 and the coiled spring 32 becomes less apt to buckle. Further freedom in designing the door spring is increased by combination of the coiled spring 32 and the plate spring 31.

Figure 50A:
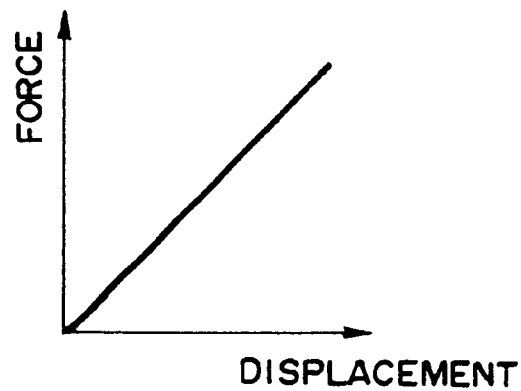
Figure 50B:
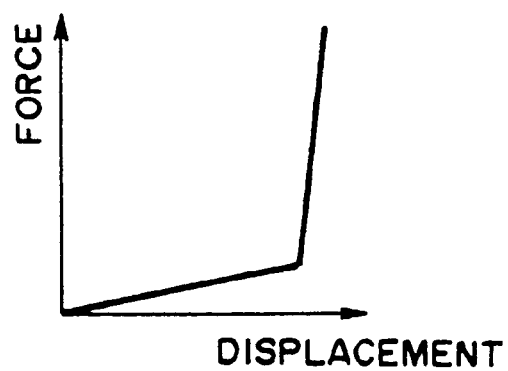
Figure 50C:
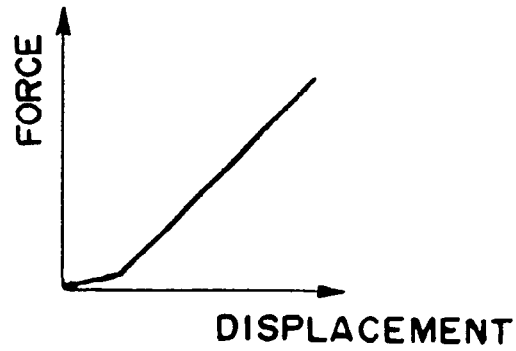

That is, in the case where only a coiled spring used, the relation between the urging force of the spring and the displacement of the spring is linear as shown in FIG. 50A whereas, in the case of a combination of a coiled spring and a plate spring or plate springs, the relation is represented by a broken line as shown in FIGS. 50B and 50C, which increases freedom in designing the door spring.

Figure 51A:
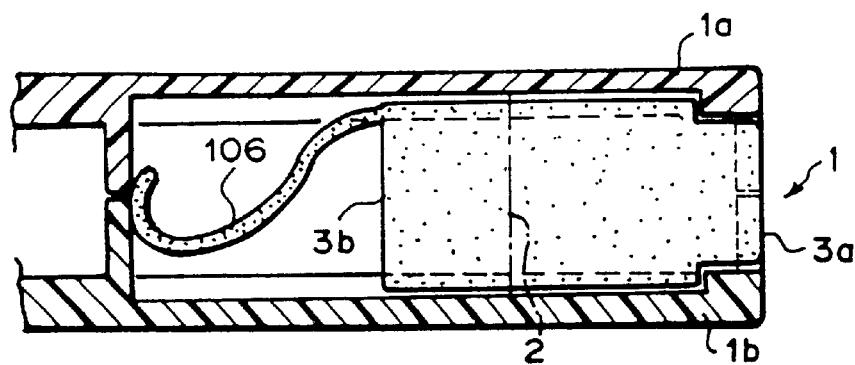
FIGS. 51A and 51B are views similar to FIGS. 21A and 21B but showing an eighteenth embodiment of the present invention.
Figure 51B:
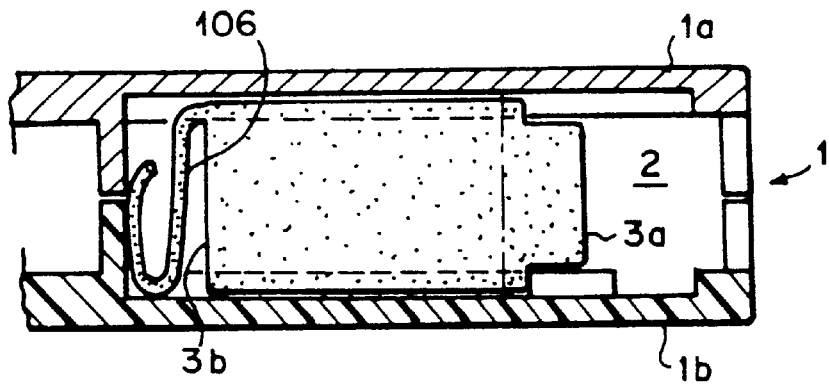
Figure 52A:
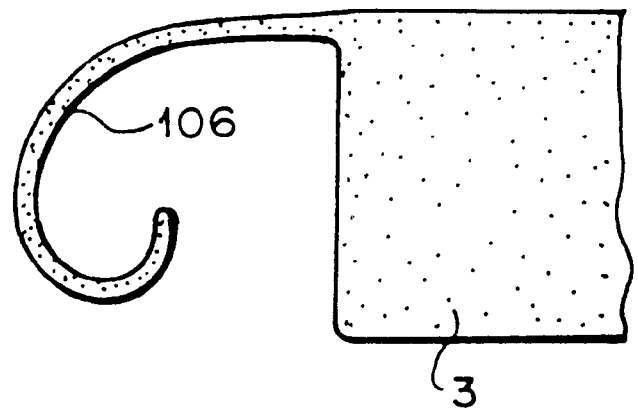
FIGS. 52A to 52C are views showing modifications of the elastic body.
Figure 52B:
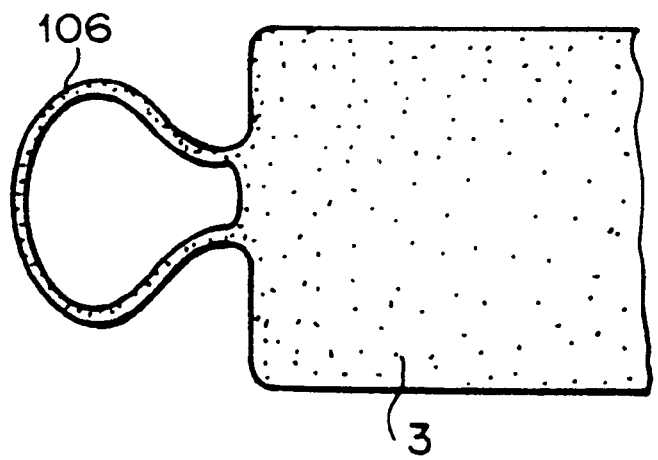
Figure 52C:
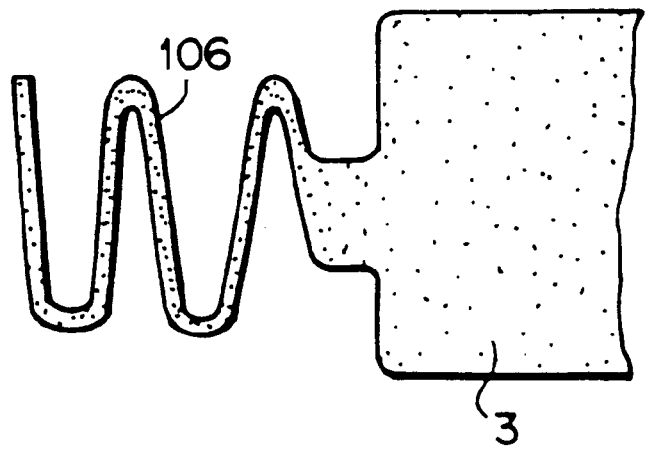

In the eighteenth embodiment shown in FIGS. 51A and 51B, the slide door 3 is formed by plastic molding and the door spring is formed by an elastic body 106 integrally molded with the slide door 3. In this particular embodiment, the elastic body 106 is substantially S-shaped. However the elastic body 106 may be of various shapes such as those shown in FIGS. 52A to 52C so long as it can urges the slide door 3 toward the closing position.

By forming the door spring by such an elastic body integrally formed with the slide door, the number of parts can be reduced and assembly of the magnetic tape cartridge is facilitated.

A nineteenth embodiment of the present invention will be described with reference to FIGS. 53 and 54, hereinbelow.

The magnetic tape cartridge of this embodiment is provided with a slide door lock mechanism for locking the slide door in the closing position in such a manner that the lock mechanism is automatically released when the slide door is pushed toward the opening position.

In this embodiment, a locking means which is brought into engagement with the slide door in response to return of the slide door to the closing position under the urging force of the door spring and locks the slide door in the closing position is provided on the cartridge casing and the working surface on which the tape drawing mechanism pushes the slide door toward the opening position is inclined so that a force pushing the slide door toward the opening position generates a component which displaces the slide door in a direction in which the slide door is disengaged from the locking means on the cartridge casing.

With this arrangement, the locking means is automatically disengaged from the slide door to permit the door to slide when the slide door is pushed toward the opening position.

Figure 53:
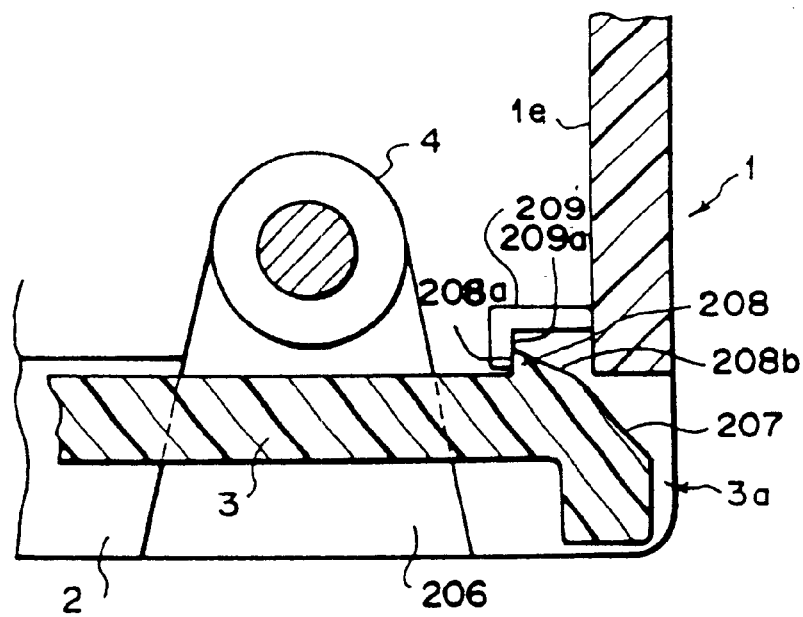
FIG. 53 is a fragmentary cross-sectional view showing an important part of the magnetic tape cartridge in accordance with a nineteenth embodiment of the present invention.

As shown in FIG. 53, the front end face 3a of the slide door 3 is provided with an inclined surface 207 as a working surface on which the tape drawing mechanism of the tape drive system acts. When the magnetic tape cartridge is loaded in the tape drive system in the direction of arrow A, a pusher in the tape drive system pushes the inclined surface 207 to open the slide door 3 overcoming the force of the door spring.

An engagement projection 208 having a vertical surface 208a facing toward the opening position of the slide door 3 and an inclined surface 208b which gently slopes downward to the inclined working surface 207 is formed on the back side of the slide door 3 near the front end face 3a.

A locking piece 209 having a vertical surface 209a which is engaged with the vertical surface 208a of the engagement projection 208 to lock the slide door 3 in the closing position extends from the inner surface 1e of the cartridge casing 1.

When the slide door 3 is returned to the closing position under the force of the door spring, the inclined surface 208b is brought into abutment against the lower end of the locking piece 209 and the front end portion of the slide door 3 and/or the locking piece 209 is resiliently deflected to permit the slide door 3 to return to the closing position. When the slide door 3 reaches the closing position, the front end portion of the slide door 3 and/or the locking piece 209 are resiliently returned to the original position and the vertical surfaces 208a and 209a are brought into engagement with each other to lock the slide door 3 in the closing position.

Figure 54:
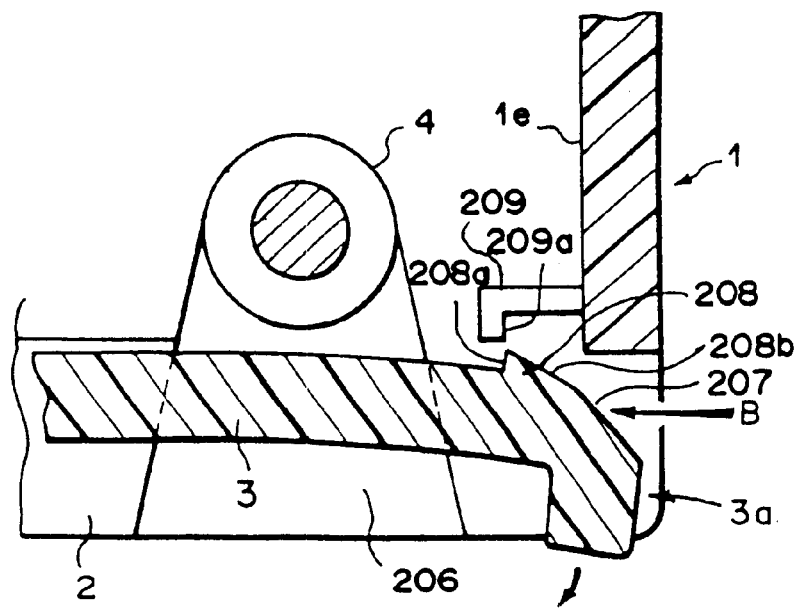
FIG. 54 is a view similar to FIG. 53 for illustrating the operation of the locking mechanism.

When a force in the direction of arrow B in FIG. 54 acts on the inclined working surface 207 during loading the magnetic tape cartridge in the tape drive system, a component which displaces outward the front end portion of the slide door 3 is generated and the vertical surfaces 208a and 209a are automatically disengaged from each other to permit the slide door 3 to slide toward the opening position.

The engagement projection 208 and the locking piece 209 may have inclined engagement surfaces 208c and 209b as shown in FIG. 55 in place of the vertical engagement surfaces 208a and 209a. Further a recess 208d may be formed on the base of the engagement projection 208 as shown in FIG. 56 so that the engagement projection 208 can be more easily deflected.

A twentieth embodiment of the present invention will be described with reference to FIGS. 57 to 59, hereinbelow.

The magnetic tape cartridge of this embodiment is also provided with a slide door lock mechanism for locking the slide door in the closing position in such a manner that the lock mechanism is automatically released when the slide door is pushed toward the opening position.

Figure 57:
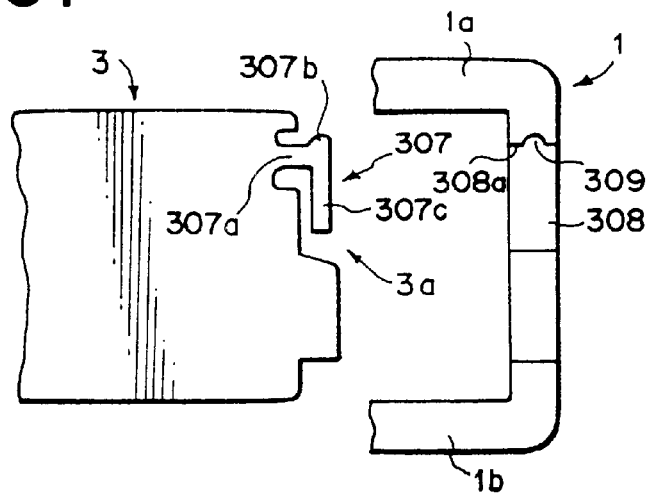
FIG. 57 is a fragmentary cross-sectional view showing an important part of the magnetic tape cartridge in accordance with a twentieth embodiment of the present invention.
Figure 58:
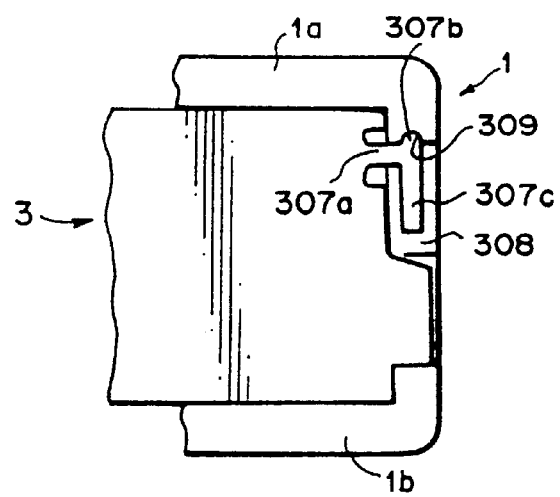
FIGS. 58 and 59 are views for illustrating the operation of the licking mechanism.

As shown in FIG. 57, the slide door 3 is provided at its front end with a locking member 307 for locking the slide door 3 in the closing position.

The locking member 307 is formed integrally with the slide door 3 and comprises a flexible leg 307a, an engagement projection 307b formed on the tip of the leg 307a to face upward, and a working portion 307c which extends downward from the tip of the leg 307a and receives an external force when the slide door 3 is opened. As the magnetic tape cartridge is loaded in the tape drive system, a pusher in the tape driving system pushes the working portion 307c to open the slide door 3.

A recess 308 is formed in the front end face of the cartridge casing so that the front end portion of the slide door 3 is received in the recess 308 when the slide door 3 is in the closing position. An engagement recess 309 which is adapted to engage with the engagement projection 307b is formed on the upper surface 308a of the recess 308.

When the slide door 3 is moved from the position shown in FIG. 57 to the closing position under the force of the door spring, the engagement projection 307b is brought into abutment against the upper surface 308a of the recess 308. At this time, the leg 307a of the locking member 307 is deflected downward and the engagement projection 307b is brought into engagement with the engagement recess 309 to lock the slide door 3 in the closing position as shown in FIG. 58.

Figure 59:
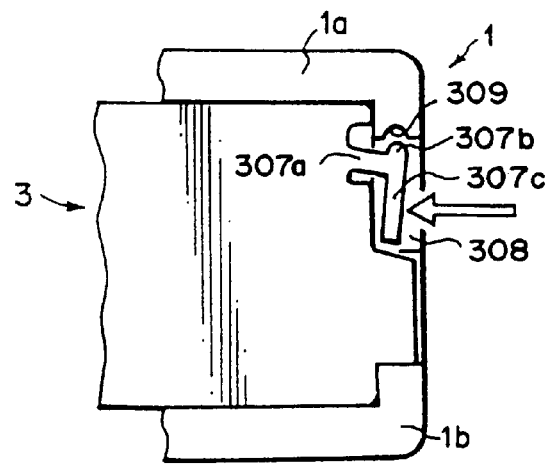

When the magnetic tape cartridge is loaded in the tape drive system, the pusher in the tape drive system pushes the working portion 307c in the direction of the arrow in FIG. 59 and the leg 307a is deflected downward to disengage the engagement projection 307b from the engagement recess 309, thereby permitting the slide door 3 to slide toward the opening position as shown in FIG. 59.

In the twenty-first embodiment of the present invention shown in FIG. 60, the slide door 403 is not provided with a door spring and is moved back and forth along the slide door passage P by a drive member in the tape drive system which pushes and pulls a knob 403a at the front end of the slide door 403.

The slide door 403 is curved inward (upward as seen in FIG. 60) and an engagement projection 403b is formed at the rear end of the slide door 403. When the slide door 403 is in the closing position, the engagement projection 403b is in engagement with a recess 411 formed on an inner wall of the door passage P. When the slide door 403 is pushed toward the opening position, the slide door 403 is resiliently deflected outward and the engagement projection 403b is disengaged from the recess 411. When the slide door 403 reaches the opening position, the engagement projection 403b is brought into engagement with another recess 412 formed on the inner wall and locks the slide door 403 in the opening position. When the slide door 403 is pulled toward the closing position, the slide door 403 is resiliently deflected outward and the engagement projection 403b is disengaged from the recess 412.

A magnetic tape cartridge in accordance with a twenty-second embodiment of the present invention will be described with reference to FIG. 61.

The magnetic tape cartridge of this embodiment is characterized in that the sliding door is provided with a means for reducing the resistance to slide.

Figure 61:
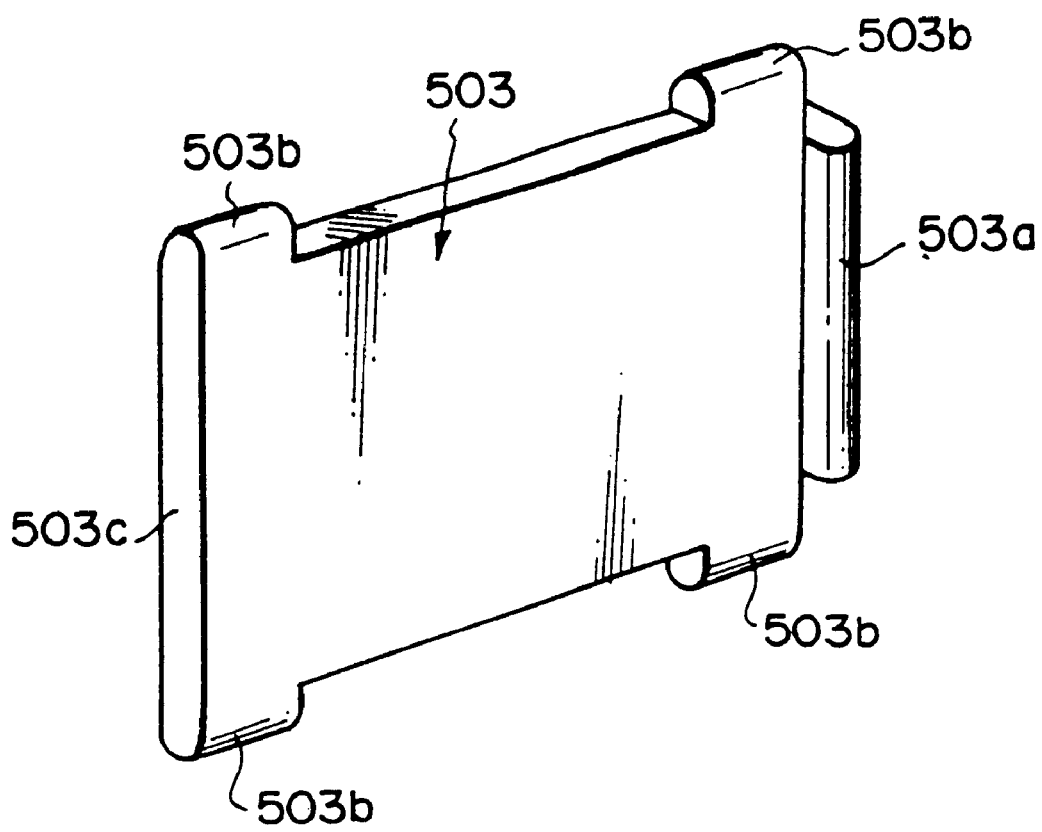
FIG. 61 is a perspective view showing the slide door in a magnetic tape cartridge in accordance with a twenty-second embodiment of the present invention.

As shown in FIG. 61, the slide 503 is provided with a pair of protrusions 503b on each of the upper and lower edges (slide surfaces). The protrusions 503b are U-shaped in cross-section. When the slide door 503 is slid between the closing position and the opening position, only the protrusions 503b are in contact with the slide surfaces of the slide passage, whereby the contact area between the slide door 503 and the sliding surfaces of the passage is reduced and the resistance to slide therebetween is reduced.

Figure 62:
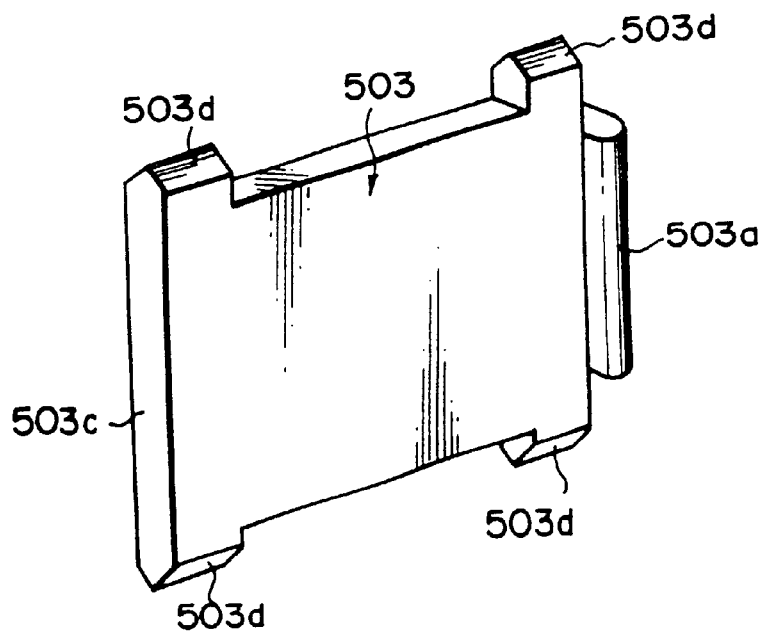
FIGS. 62 to 66 are perspective views showing the modification of the slide door shown in FIG. 61.

The slide 503 may be provided with protrusions 503d which are V-shaped in cross-section as shown in FIG. 62 in place of the protrusions 503b which are U-shaped in cross-section.

Figure 63:
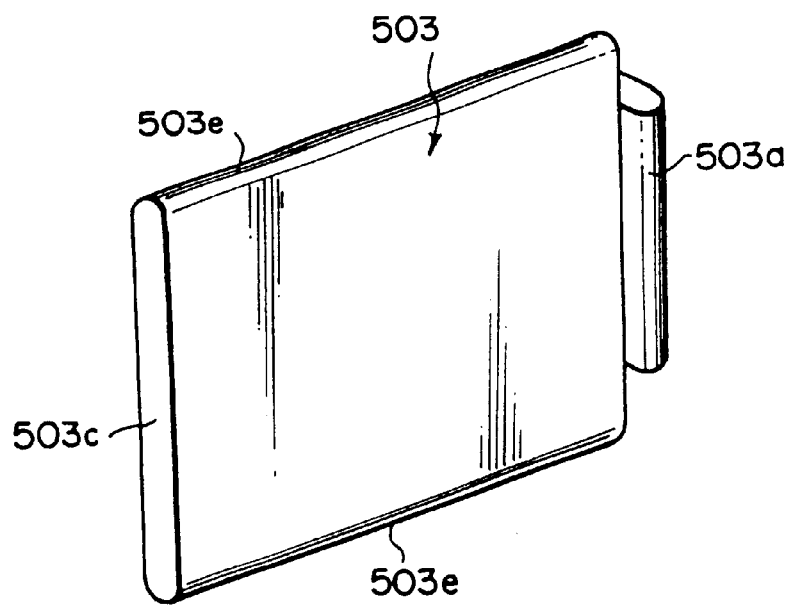
Figure 64:
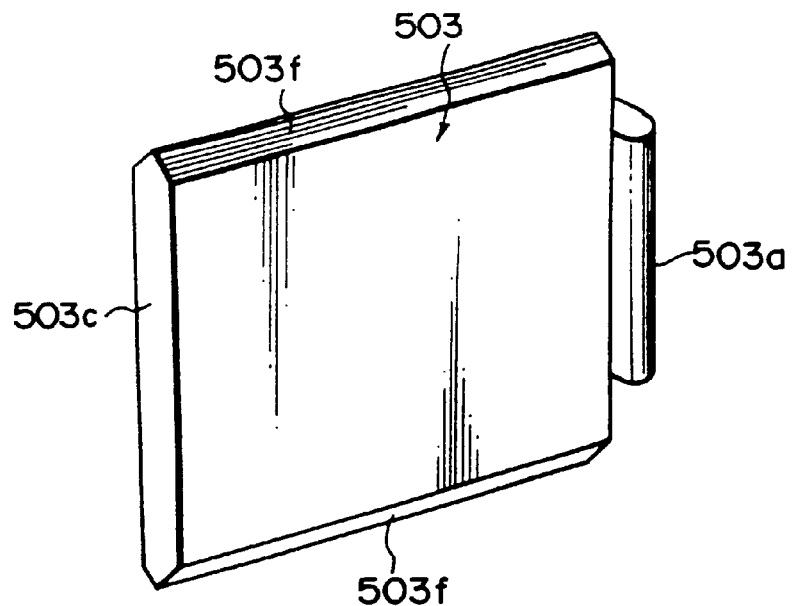

Further in place of forming protrusions which are U-shaped or V-shaped in cross-section, the upper and lower sliding surfaces may be continuously U-shaped or V-shaped in cross-section as indicated at 503e and 503f in FIGS. 63 and 64.

Figure 65:
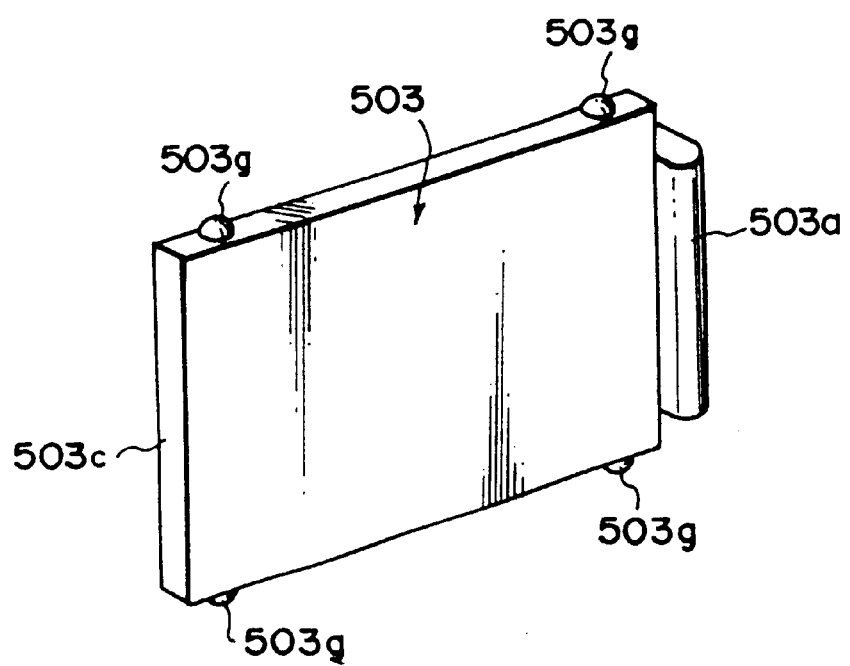

In the modification shown in FIG. 65, the slide 503 is provided with a pair of semi-spherical projections 503g on each of the upper and lower slide surfaces.

Figure 66:
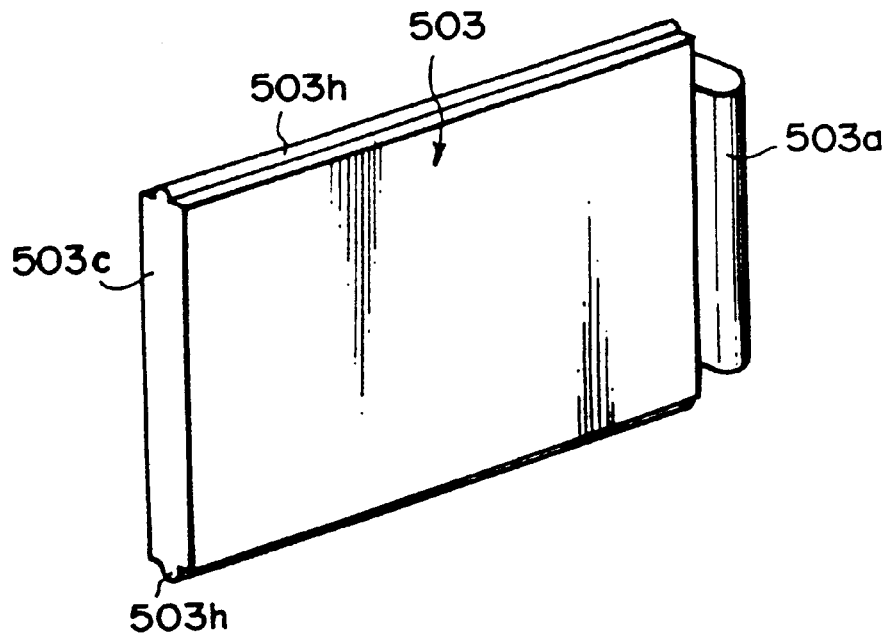
Figure 67:
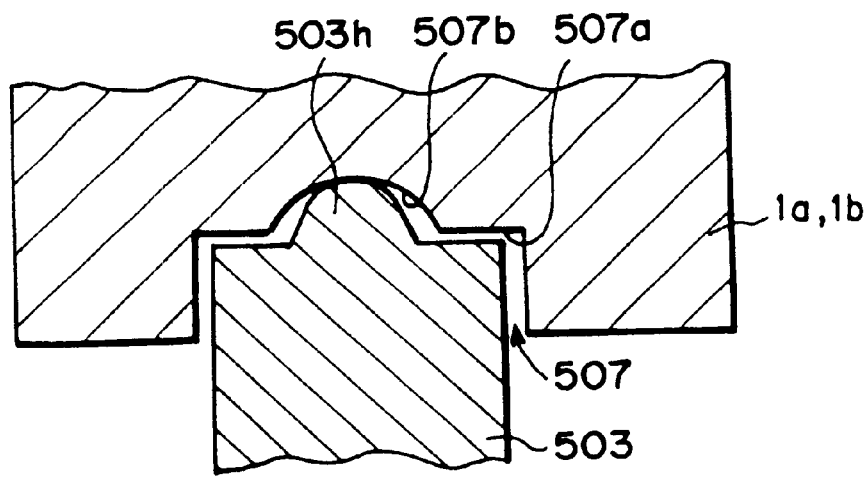
FIG. 67 is a fragmentary cross-sectional view showing an important part of the slide door shown in FIG. 66 and the sliding surface of the slide door passage.
Figure 68:
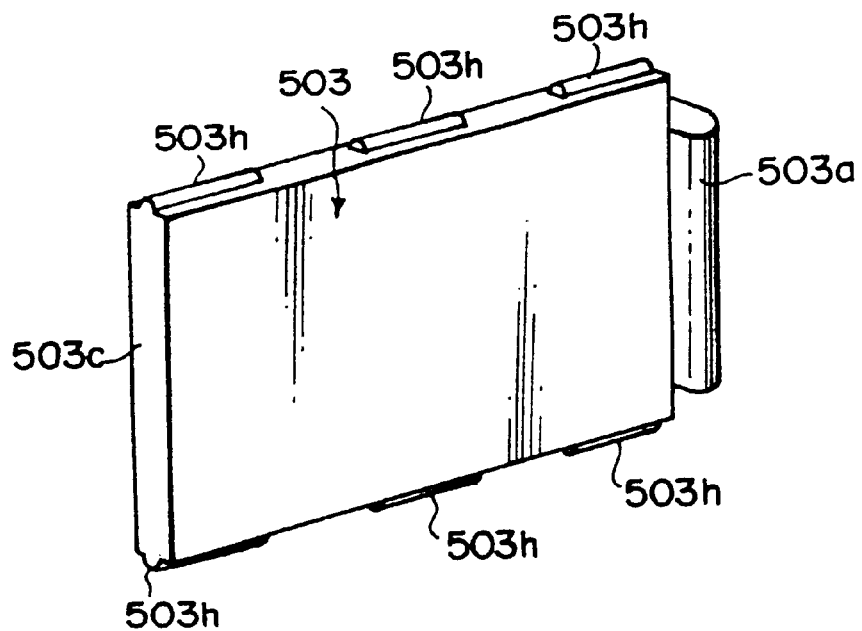
FIGS. 68 and 69 are perspective views showing other modifications of the slide door shown in FIG. 61, FIGS. 70 and 71 are views similar to FIG. 67 but showing still other modifications of the slide door shown in FIG. 61.

In the modification shown in FIGS. 66 and 67, a narrow protrusion 503h is formed on each of the sliding surfaces of the slide door 503 to extend over the entire length of the sliding surface.

As shown in FIG. 67, each of the upper and lower sliding surfaces 507a of the slide door passage 307 is provided with a recess 507b extending over the entire length of the sliding surfaces 507a. The protrusions 503h are received in the recesses 507b. With this arrangement, the resistance to slide is reduced and at the same time, since the protrusions 503h are received in the recesses 570b, dust-proof effect is increased.

The protrusion 503h may be discontinuous as shown in FIG. 67.

Figure 69:
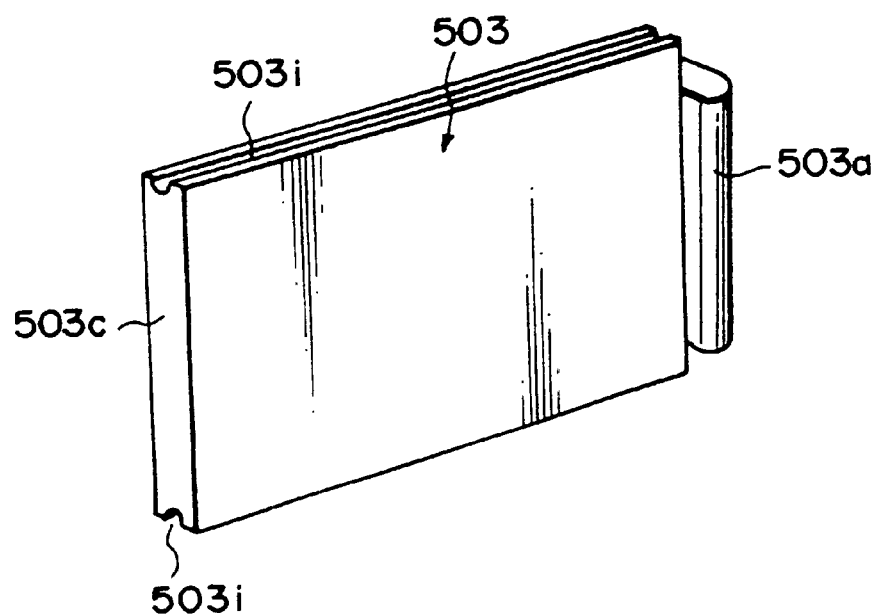
Figure 70:
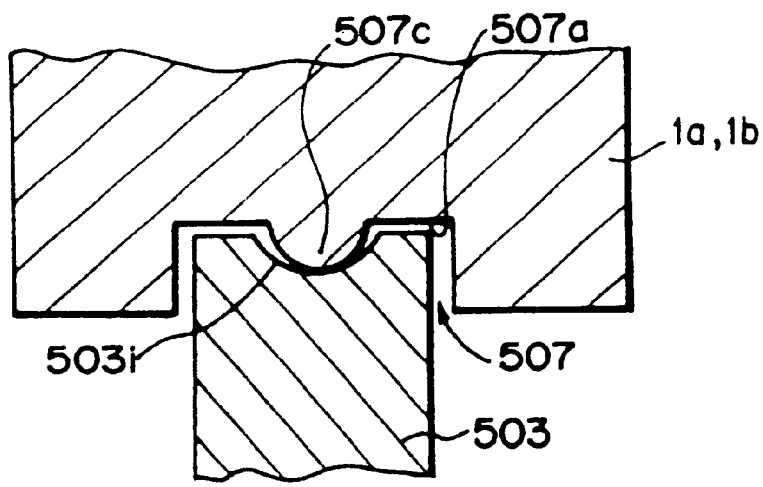

Further, the sliding surfaces of the slide door 503 may be provided with recesses 503i and the sliding surfaces of the slide door passage 507 may be provided with narrow protrusions 507c as shown in FIGS. 69 and 70.

Figure 71:
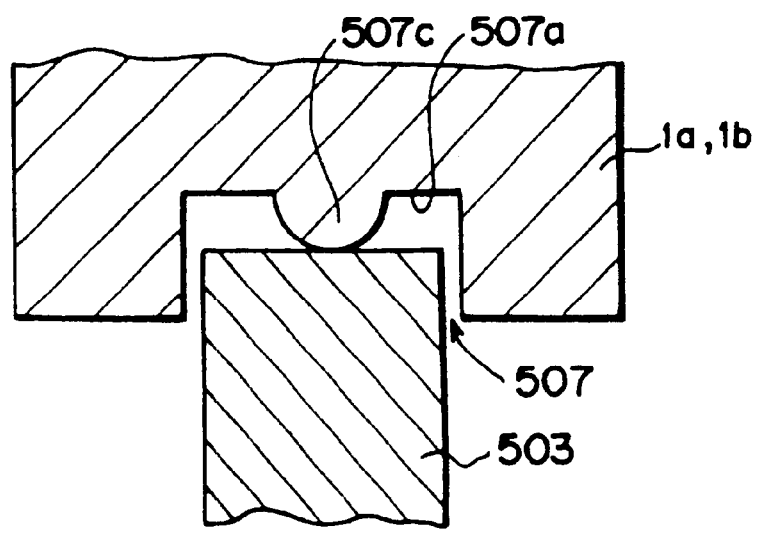

Further the sliding surfaces of the slide door passage 507 may be provided with narrow protrusions 507c with the sliding surfaces of the slide door 503 kept flat as shown in FIG. 71.

It is preferred that the protrusions on the sliding surfaces of the slide door 503 and/or the protrusions on the sliding surfaces of the slide door passage be chamfered, rounded or rounded into a ball-like shape.

A magnetic tape cartridge in accordance with a twenty-third embodiment of the present invention is provided with a slide door 603 formed of metal shown in FIGS. 72A to 72D.

Figure 72A:
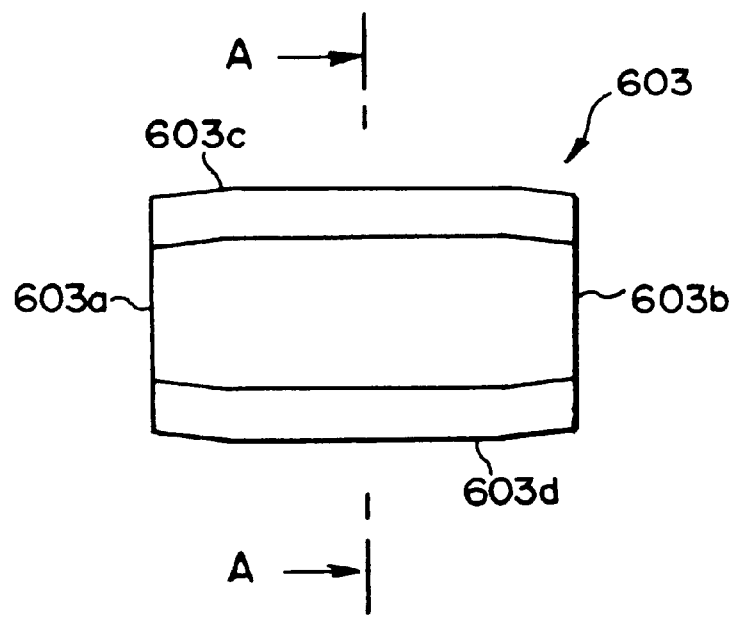
FIG. 72A is a front view of the slide door employed in the magnetic tape cartridge in accordance with a twenty-third embodiment of the present invention.
Figure 72B:
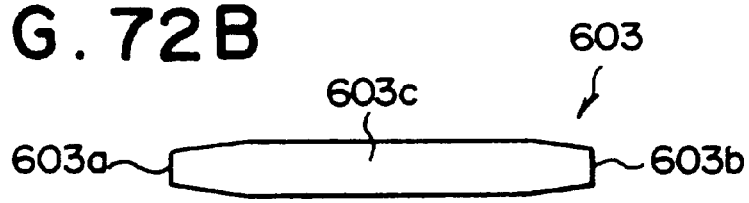
FIG. 72B is a plan view of the slide door.
Figure 72C:
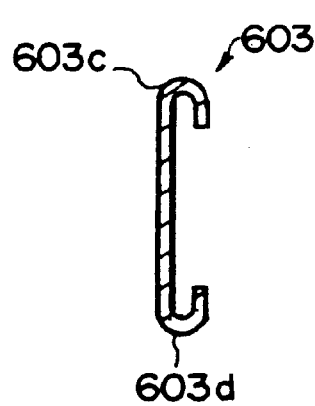
FIG. 72C is a cross-sectional view taken along line A—A in FIG. 72A.
Figure 72D:
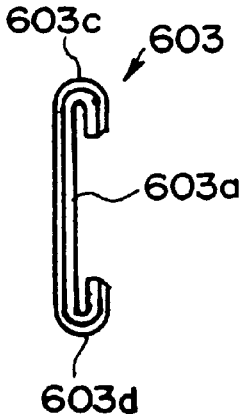
FIG. 72D is a side view of the slide door.

The slide door 603 has upper and lower edges 603c and 603d which are folded as shown in FIG. 72C. The front and read end portions of the slide door 603 including the front and rear end faces 603a and 603b are pressed by dies or the like so that the end portions are slightly tapered as shown in FIG. 72D.

With this arrangement, the curved surfaces of the upper and lower edges 603c and 603d abut against the tape outlet opening 2 and the end portions of the upper and lower edges 603c and 603d are brought into abutment against the tape outlet opening 2, whereby the tape outlet opening is prevented from being cut by a cut surface of metal.

Figure 73:
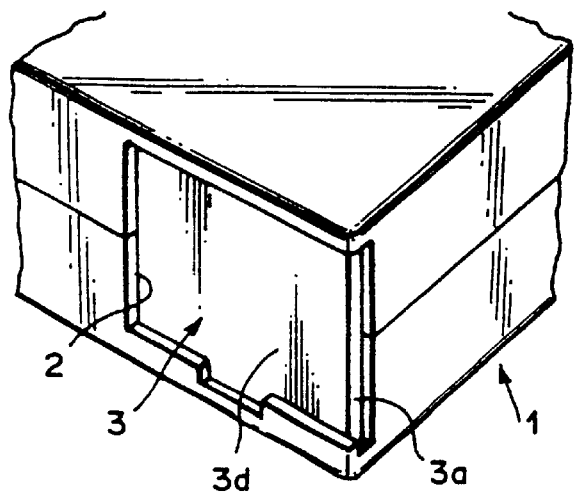
FIG. 73 is an enlarged perspective view of a part of the magnetic tape cartridge shown in FIG. 1.
Figure 74:
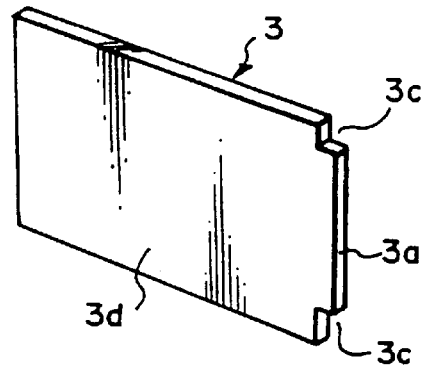
FIG. 74 is a perspective view of the slide door.

FIG. 73 is an enlarged perspective view of a part of the magnetic tape cartridge shown in FIG. 1. As shown in FIG. 73, the outer surface 3d and the front end face 3a of the slide door 3 are positioned inside the outer surface of the cartridge casing 1. That is, the outer surface 3d is arranged to slide on the inner surface of the cartridge casing 1. Further a pair of cutaway portions 3c are formed on the front end portion of the slide door 3 as shown in FIG. 74 and when the slide door 3 is in the closing position, the cutaway portions are in contact with the inner surface of the cartridge casing 1. The depth of the cutaway portion i3c is selected so that the front end face 3a is positioned inside the outer surface of the cartridge casing 1 as shown in FIG. 73.

With this arrangement, impact does not directly act on the slide, for instance, when the magnetic tape cartridge is dropped onto the floor, whereby the slide door 3 is prevented from being broken.

Figure 75:
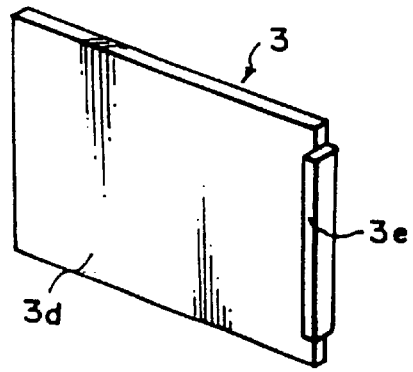
FIG. 75 is a perspective view of a modification of the slide door.
Figure 76:
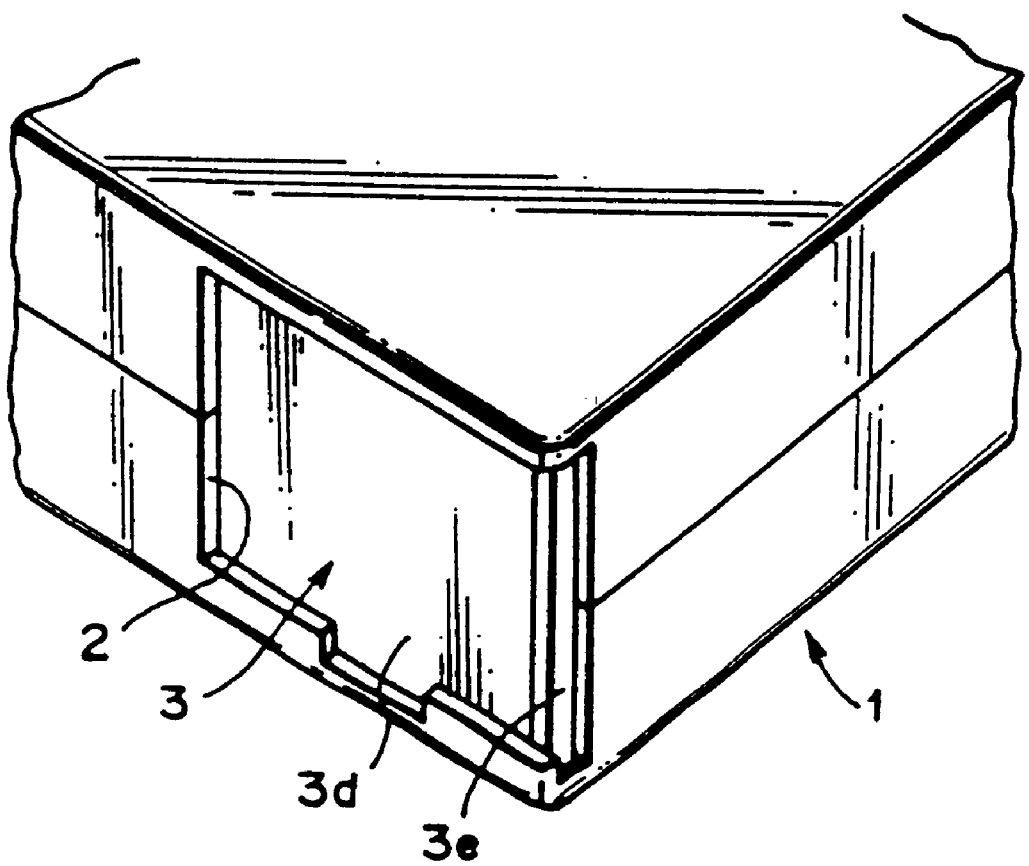
FIG. 76 is an enlarged perspective view of a part of the magnetic tape cartridge in which the slide door shown in FIG. 75 is employed.

In the case where the slide door 3 is provided with a notch portion 3e for facilitating opening of the slide door 3 as shown in FIG. 75, it is preferred that also the outer surface of the notch portion 3e be positioned inside the outer surface of the cartridge casing 1 as shown in FIG. 76.

What is claimed is:

1. The magnetic tape cartridge comprising a cartridge casing, a single reel around which a magnetic tape is wound and which is contained in the cartridge casing for rotation, a slide door having a working surface for opening and closing a tape outlet opening mounted on the cartridge casing to be linearly slidable between a closing position where it closes the tape outlet opening and an opening position where it opens the tape outlet opening, and a door spring for urging the slide door toward the closing position and holding the same in the closing position is disposed on the door passage, wherein the improvement comprises that a locking means which is brought into engagement with the slide door in response to return of the slide door to the closing position under the urging force of the door spring and locks the slide door in the closing position is provided on the cartridge casing and the working surface on which the slide door is pushed toward the opening position is inclined so that a force pushing the slide door toward the opening position generates a component which displaces the slide door in a direction in which the slide door is disengaged from the locking means on the cartridge casing.

* * * * *